United States Patent
Shukunami et al.

(10) Patent No.: US 8,655,170 B2
(45) Date of Patent: *Feb. 18, 2014

(54) OSNR MONITOR DEVICE AND OSNR MEASUREMENT DEVICE

(75) Inventors: Norifumi Shukunami, Kawasaki (JP);
Kentaro Nakamura, Kawasaki (JP);
Noriaki Mizuguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 549 days.

This patent is subject to a terminal disclaimer.

(21) Appl. No.: 12/818,613

(22) Filed: Jun. 18, 2010

(65) Prior Publication Data

US 2010/0322622 A1    Dec. 23, 2010

(30) Foreign Application Priority Data

Jun. 19, 2009  (JP) ................................. 2009-147016
Mar. 31, 2010  (JP) .................................. 2010-83786

(51) Int. Cl.
*H04B 10/08* (2011.01)
*H04B 17/00* (2006.01)

(52) U.S. Cl.
USPC ............................................. 398/26; 398/25

(58) Field of Classification Search
USPC ...................................... 398/26, 25
See application file for complete search history.

(56) References Cited

U.S. PATENT DOCUMENTS

| 5,340,979 | A | 8/1994 | Baney et al. |
| 6,344,910 | B1 * | 2/2002 | Cao ................................. 398/34 |
| 7,149,407 | B1 * | 12/2006 | Doerr et al. .................... 385/147 |
| 7,499,173 | B1 | 3/2009 | Brodsky et al. |
| 2002/0118422 | A1 * | 8/2002 | Cao ................................. 359/161 |
| 2004/0114923 | A1 * | 6/2004 | Chung et al. .................... 398/26 |
| 2007/0297043 | A1 | 12/2007 | Kao et al. |
| 2008/0089700 | A1 | 4/2008 | Takahashi |
| 2008/0205886 | A1 * | 8/2008 | Anderson et al. ............... 398/26 |
| 2010/0111540 | A1 * | 5/2010 | Caplan et al. ................. 398/140 |
| 2011/0311222 | A1 * | 12/2011 | Nakamura et al. .............. 398/26 |

FOREIGN PATENT DOCUMENTS

| JP | 3311102 | 5/2002 |
| JP | 3467296 | 11/2003 |
| JP | 2008-98975 | 4/2008 |
| JP | 2010-25670 | 2/2010 |

OTHER PUBLICATIONS

M. Bakaul, "Low-Cost PMD-Insensitive and Dispersion Tolerant In-Band OSNR Monitor Based on Uncorrelated Beat Noise Measurement", IEEE Photonics Technology Letters, vol. 20, No. 11, pp. 906-909, Jun. 1, 2008.*

(Continued)

*Primary Examiner* — Daniel Dobson
(74) *Attorney, Agent, or Firm* — Staas & Halsey LLP

(57) ABSTRACT

An OSNR monitor device includes an optical receiver including a delay interferometer which inputs an optical signal in accordance with a given bandwidth and outputs two optical signals and causes the optical signals to interfere with each other and optical detectors which outputs currents in accordance with optical powers of the optical signals output from the interferometer, an optical power monitor configured to obtain the optical powers of the optical signals received by the optical detectors included in the optical receiver, and an OSNR calculator configured to calculate an optical signal-to-noise ratio in accordance with the optical powers obtained from the optical power monitor and the reception bandwidth.

15 Claims, 32 Drawing Sheets

(56) References Cited

OTHER PUBLICATIONS

Bakual, M., "Low-Cost PMD-Insensitive and Dispersion Tolerant In-Band OSNR Monitor Based on Uncorrelated Beat Noise Measurement", IEEE Photonics Technology Letters, vol. 20, No. 11, Jun. 1, 2008, pp. 906-908.

Oh, J. M., et al., "Interferometric optical signal-to-noise ratio measurements of telecom signals with degraded extinction ratio", Optics Letters, Optical Society of America, Sep. 15, 2008, pp. 2065-2067.
Communication dated Oct. 21, 2010 and issued from the European Patent Office in the corresponding European patent application.
Japanese Office Action issued Dec. 24, 2013 for Japanese Application No. 2010-083786.

* cited by examiner

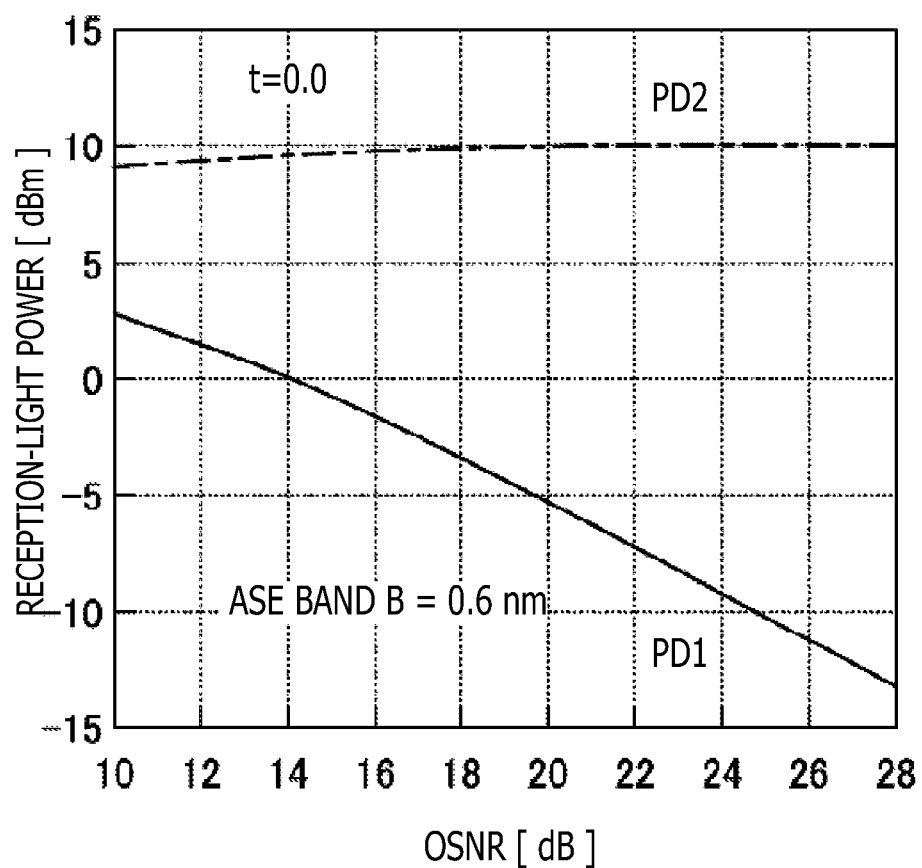

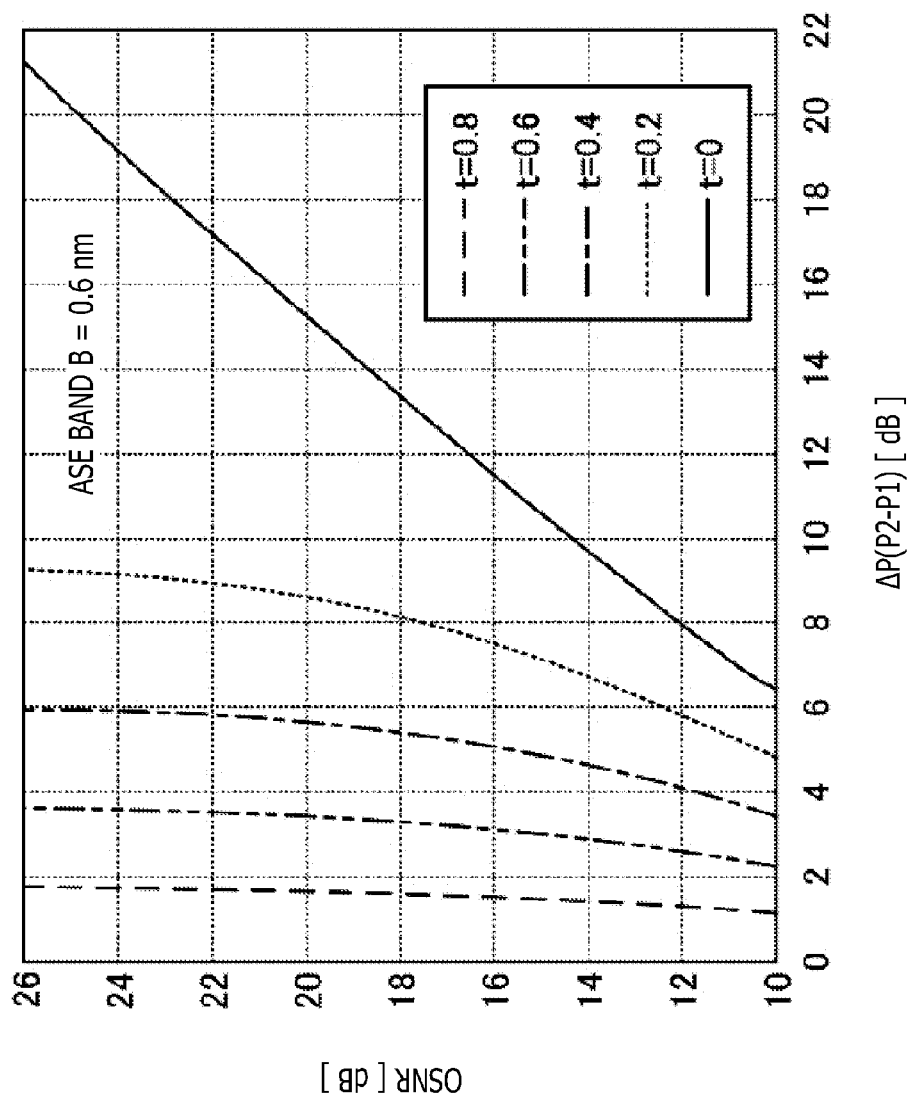

OSNR MONITOR DEVICE AND OSNR MEASUREMENT DEVICE

CROSS REFERENCE TO RELATED APPLICATION

This application is based upon and claims the benefit of priority of the prior Japanese Patent Application No. 2009-147016 filed on Jun. 19, 2009, and the prior Japanese Patent Application No. 2010-083786 filed on Mar. 31, 2010, the entire contents of which are incorporated herein by reference.

FIELD

Various embodiments described herein relate to an OSNR monitor device and an OSNR measurement device.

BACKGROUND

Conventionally, an optical communication system in which a transmitter transmits an optical signal and a receiver receives the optical signal through an optical fiber serving as a transmission path has been used. In such an optical communication system, an optical amplifier is used to compensate for a loss of a transmission path.

The optical amplifier used in the optical communication system includes a post amplifier arranged on an output side of the transmitter, a preamplifier arranged in front of the receiver, or an inline amplifier used for multistage relay. In recent years, an EDFA (Erbium-Doped Fiber Amplifier) using an erbium-doped fiber has been broadly used for an optical communication system of a 1550-nm band.

Furthermore, as a demand for communication has increased owing to wide use of the Internet, a wavelength division multiplexing (WDM) system which makes use of a broadband characteristic of an optical amplifier has been developed. In recent years, a ROADM (Reconfigurable Optical Add/Drop Multiplexer) system in which the WDM system is combined with a wavelength routing technique as shown in FIG. 27 has been employed in a metropolitan ring network in order to flexibly and efficiently operate an optical transmission network. The ROADM system includes optical components such as an optical branching coupler, an optical switch, and a wavelength multiplexer/demultiplexer. The optical amplifier is used to compensate for losses in the optical components.

In such a ROADM system, as light amplified by the optical amplifier, an amplified optical signal and an amplified spontaneous emission (ASE) are output. Since the ASE is generated in a random manner and interferes with the signal light beam, the ASE corresponds to a noise component for the signal light beam in the optical communication system. That is, a performance of an optical receiver in the ROADM system is also limited by this noise component. Therefore, in the optical communication system, it is important to measure an optical signal component and a noise component. Normally, as an index of a capability of the optical receiver, an OSNR (Optical Signal-to-Noise Ratio) resistance calculated as a ratio of an optical signal component to a noise component is used.

Furthermore, in a broadband access network, as a FTTH (Fiber To The Home) is broadly used, demands for audio data, video data which requires a high capacity, and the like have been increased. Furthermore, a transmission rate per wavelength in the WDM system has been shifted from 10 Gbps to 40 Gbps. In an optical communication system having a transmission rate of 40 Gbps or larger, a pulse interval of one bit width is smaller and a frequency band of a signal is larger when compared with an optical communication system having a transmission rate of 10 Gbps. Therefore, the optical communication system having the transmission rate of 40 Gbps or larger is affected by noise of an optical amplifier, wavelength dispersion of a transmission-path optical fiber, and polarization mode dispersion, and accordingly, a transmission characteristic is considerably deteriorated.

Accordingly, as a method different from relevant OOK (On Off Keying), an optical modulation method such as DPSK (Differential Phase Shift Keying) or DQPSK (Differential Quadrature Phase Shift Keying) is employed, for example. Note that an example of a type of the DPSK modulation method includes NRZ-DPSK (Non Return to Zero-DPSK).

Here, a method for calculating an OSNR when the various phase modulation methods described above are employed in the ROADM system will be described. First, a calculation equation for the OSNR will be described. The calculation equation for the OSNR is represented by a ratio of an optical signal output power (Psig [mW]) relative to an ASE power (Pase, 0.1 nm [mW]) in a signal wavelength of a 0.1-nm band.

Expression (1)

$$OSNR[dB] = 10 \times \log\left(\frac{Psig}{Pase, 0.1\,\text{nm}}\right) \quad (1)$$

Next, an optical signal output power (Psig [mW]) and an ASE power (Pase, 0.1 nm [mW]) included in Expression (1) will be described in detail. A WDM EDFA is employed as a preamplifier of ROADM nodes shown in FIG. 27, and a spectrum output from the WDM EDFA, i.e., a spectrum supplied to a demultiplexer after being amplified is shown in FIG. 28. Note that FIG. 28 is a graph illustrating an example of a spectrum supplied to the demultiplexer after being amplified in an optical communication system according to the related art.

For example, as shown in FIG. 28, the WDM EDFA amplifies a signal of a 1550-nm band and generates a wide-band ASE for approximately 40 nm. In a ROADM system which is a long-distance transmission optical system including multistage-relay WDM EDFAs, the ASE is increased every time the ASE is supplied through the WDM EDFAs.

On the other hand, each of receivers in the ROADM system receives a spectrum of one of waves obtained by demultiplexing a spectrum output from a WDM EDFA using the wavelength demultiplexer, that is, each of the receivers receives a spectrum in which an optical signal and an ASE are superposed with each other as shown in FIG. 29. Note that FIG. 29 is a diagram illustrating a spectrum obtained through demultiplexing performed by the wavelength demultiplexer in an optical communication system according to the related art.

Accordingly, when an OSNR is to be obtained, an optical spectrum as shown in FIG. 29 received by a receiver is measured using an optical spectrum analyzer, an optical signal power and an ASE power are separated from the measured optical spectrum, and the obtained optical power values are assigned to Expression (1) to be calculated.

Related Art Document: Japanese Unexamined Patent Application Publication No. 2008-098975

However, in the related art described above, there arises a problem in that an optical spectrum analyzer having a complicated optical configuration is required. Furthermore, since a signal spectrum spreads at a time of signal modulation, it is difficult to separate the optical signal power and the ASE power from the optical spectrum, and therefore, reliable monitoring is not ensured.

For example, as a signal spectrum obtained when a signal modulation is performed on condition that the DQPSK is employed, a symbol time is equal to 1/21.5 GHz, an optical fiber bandwidth f-3 dB is equal to 0.26 nm, and an OSNR is equal to 20 dB, (1) a signal spectrum 111 which is obtained upon modulation and which represents an ASE spectrum and (2) a signal spectrum 121 obtained after being supplied through a demultiplexer of a bandwidth of 0.26 nm are shown in FIG. 30. As for the signal received (DROP) by a receiver or a signal transmitted (ADD) by a transmitter, bands of both ends in a horizontal direction are cut as denoted by (2) of FIG. 30 by an optical filter, a demultiplexer, or the like, and therefore, determination as to whether this signal corresponds to an ASE is not reliably made. That is, since it is difficult to separate an optical signal power and an ASE power from a signal spectrum at a time of signal modulation, reliable monitoring is not performed. Note that FIG. 30 is a diagram illustrating a signal spectrum at a time of signal modulation in an optical communication system according to the related art.

Furthermore, a method for measuring a BER (Bit Error Rate) may be employed as a method for monitoring an optical transmission quality. However, in this method, since deterioration of wavelength dispersion, PMD (Polarization-Mode Dispersion), XPM (Cross Phase Modulation), FWM (Four-Wave Mixing), and the like are measured in addition to deterioration of the OSNR, the OSNR is not accurately monitored.

SUMMARY

According to an aspect of the invention, an OSNR monitor device includes: an optical receiver including a delay interferometer which inputs an optical signal in accordance with a given bandwidth and outputs two optical signals and causes the optical signals to interfere with each other and optical detectors which outputs currents in accordance with optical powers of the optical signals output from the interferometer; an optical power monitor configured to obtain the optical powers of the optical signals received by the optical detectors included in the optical receiver; and an OSNR calculator configured to calculate an optical signal-to-noise ratio in accordance with the optical powers obtained from the optical power monitor and the reception bandwidth.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 14E illustrates the relationship between an OSNR obtained when a rate t of a delay time for one bit time is set to 0 and reception-light powers of the optical detectors;

FIG. 15 illustrates the relationship between the OSNR and a difference $\Delta P$ between the optical detectors;

DESCRIPTION OF THE PREFERRED EMBODIMENTS

Hereinafter, embodiments of an OSNR monitor device and an OSNR measurement device to be disclosed in this application will be described in detail with reference to the accompanying drawings. Note that the present invention is not limited to these embodiments.

First Embodiment

Entire Configuration of Optical Communication System

First, Referring to FIG. 1, an entire configuration of an optical communication system including an OSNR measurement device according to a first embodiment will be described.

Figure 1:
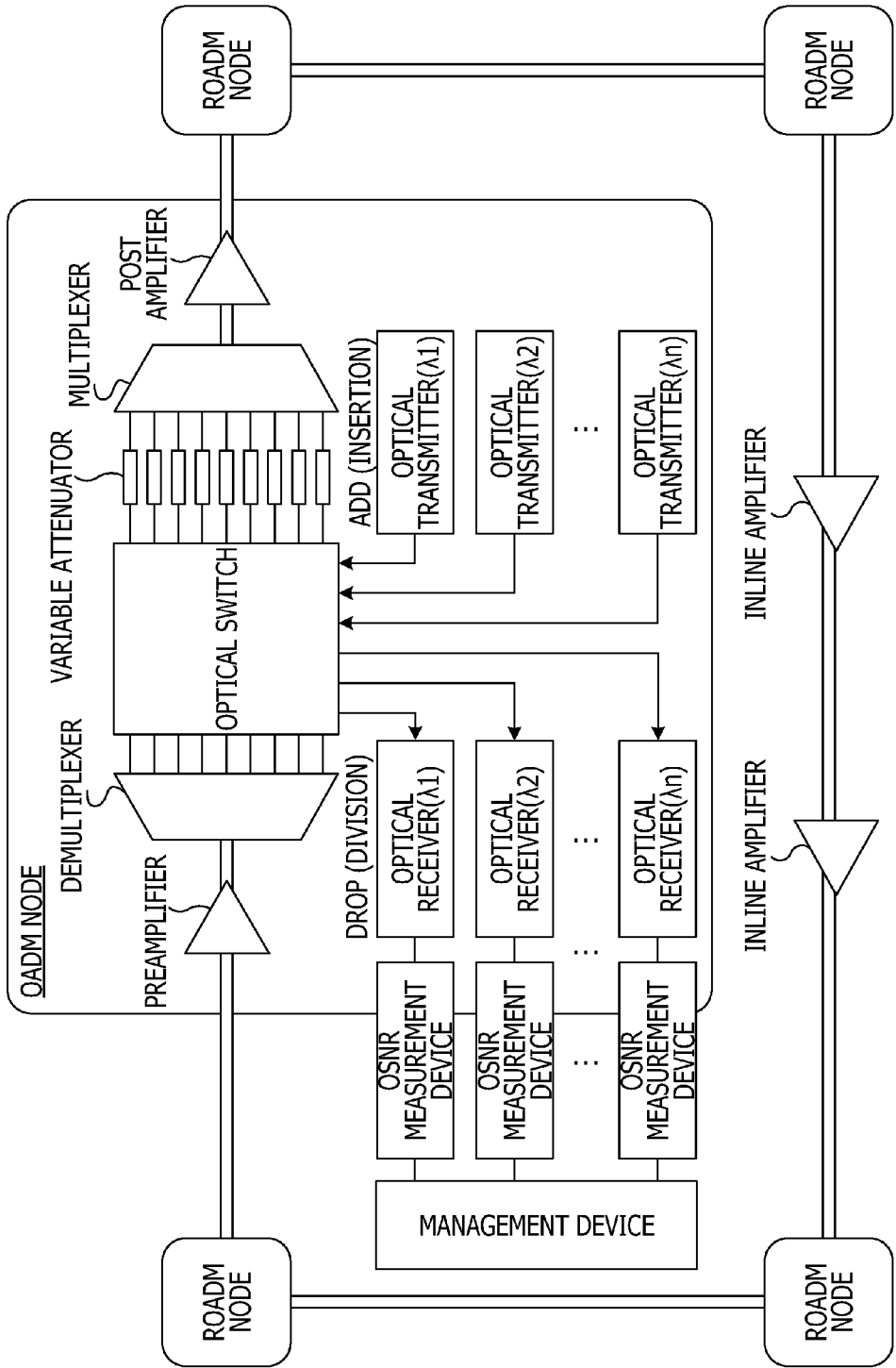
FIG. 1 illustrates an entire configuration of an optical communication system including an OSNR measurement device according to a first embodiment.

As shown in FIG. 1, in this optical communication system, a plurality of ROADM nodes are connected to one another through a transmission path using an optical fiber, and inline amplifiers used to compensate for a loss of the transmission path are provided between the adjacent ROADM nodes.

Furthermore, in each of the ROADM nodes, a post amplifier is arranged on an output side (transmitter side) and a preamplifier is arranged on an input side (before a receiver), and a demultiplexer, an optical switch, variable attenuators, and a multiplexer are arranged between the preamplifier and the post amplifier. Note that the demultiplexer demultiplexes a received light beam for individual channels and outputs demultiplexed light beams to the optical switch. The optical switch which is connected to optical transmitters and optical receivers through interfaces such as transponders outputs signals which have been inserted (ADD) from the optical transmitters to the variable attenuators and divides (DROP) optical signals obtained through demultiplexing performed by the demultiplexer to the optical receivers. The variable attenuators which can change attenuation amounts attenuate signals so as to obtain appropriate signal levels and output the signals to the multiplexer. The multiplexer multiplexes signal levels output from the variable attenuators which have been received for individual channels and outputs a multiplexed signal to one of the ROADM nodes connected to a ROADM node of interest.

An OSNR measurement device included in the optical communication system can accurately measure an OSNR without using an expensive optical spectrum analyzer. Furthermore, the OSNR measurement device outputs the measured OSNR to a management device through a network such as Ethernet.

Specifically, the OSNR measurement device obtains a bandwidth (B (nm)) used in the demultiplexer (WDM DMUX) which demultiplexes a light signal so that each of the optical receivers receives a light beam based on a predetermined bandwidth. Furthermore, the OSNR measurement device obtains optical powers (P1 and P2 (mW)) output from a delay interferometer such as an MZ interferometer (Mach-Zehnder interferometer) generated by inputting a signal obtained through the demultiplexing performed by the demultiplexer to the delay interferometer.

Then, each of the OSNR measurement devices measures an optical signal-to-noise ratio (OSNR) using the obtained bandwidth (B (nm)) and the obtained optical powers (P1 and P2 (mW)).

As described above, the OSNR measurement device according to the first embodiment measures an OSNR using information required for OSNR measurement obtained from the demultiplexer and optical detectors of the optical receiver included in the optical communication system. As a result, an OSNR is accurately measured without using an expensive optical spectrum analyzer.

Configuration of OSNR measurement Device

Figure 2:
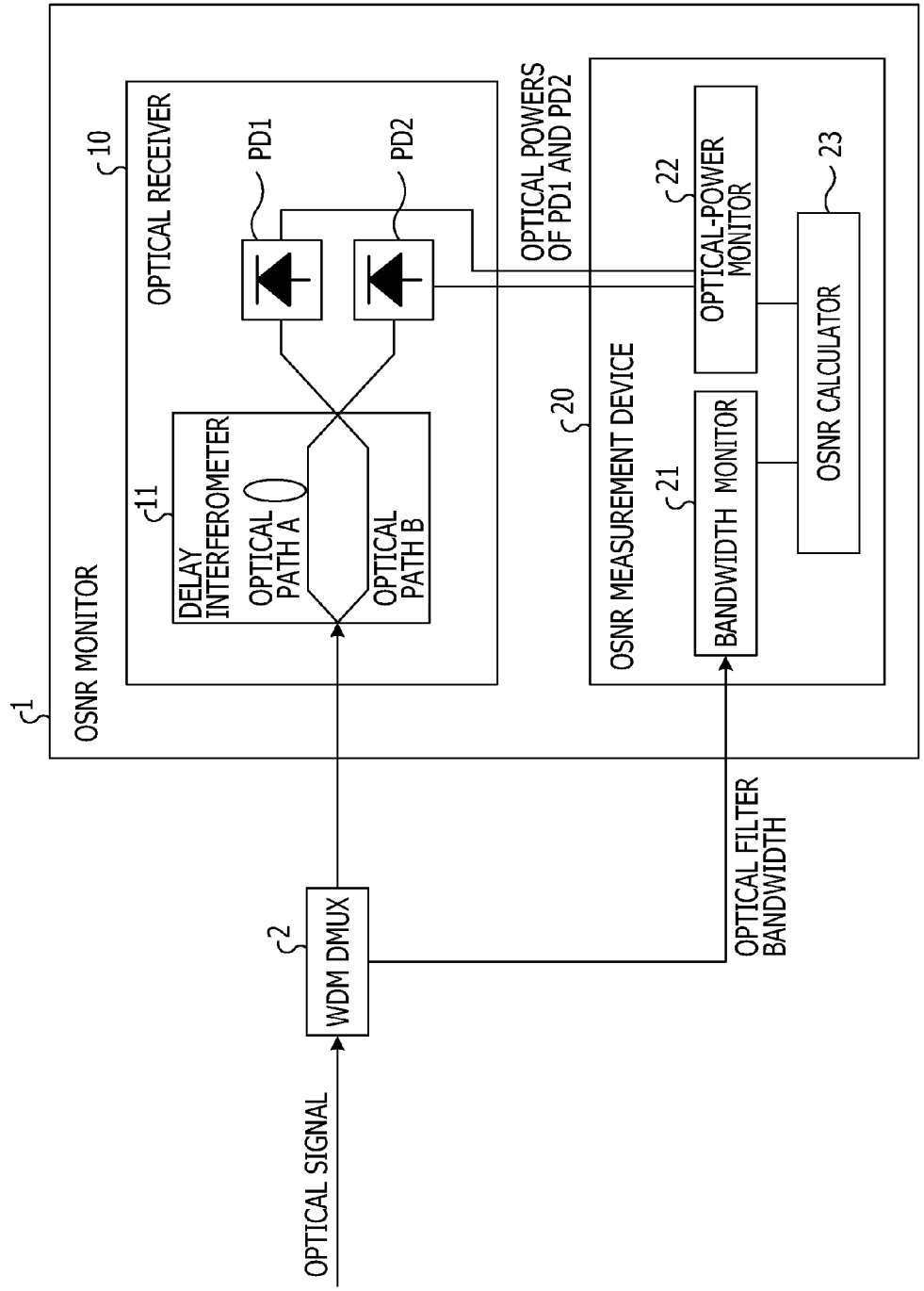
FIG. 2 illustrates a configuration of an OSNR monitor including the OSNR measurement device according to the first embodiment.

FIG. 2 illustrates a configuration of an OSNR monitor including the OSNR measurement device according to the first embodiment. As shown in FIG. 2, an OSNR monitor 1 includes an optical receiver 10 which receives an optical signal and an OSNR measurement device 20 which measures an OSNR of the optical receiver 10 and is connected to a demultiplexer (WDM DMUX) 2.

The demultiplexer (WDM DMUX) 2 extracts signal light of a desired reception wavelength from wavelength-multiplexed signal light output from the optical switch. Specifically, the demultiplexer 2 includes an optical filter in which a passband is set in advance, and the optical filter performs filtering on an optical signal output from the optical switch. Then, the demultiplexer 2 outputs the optical signal which has been subjected to the filtering performed by the optical filter to the optical receiver 10.

The optical receiver 10 included in the OSNR monitor 1 includes a delay interferometer 11 and optical detectors PD1 and PD2 and receives an intensity-modulation optical signal which is transmitted from another ROADM node, CW light, and the like. The delay interferometer 11 divides the received optical signal into two (optical paths A and B). Then, the delay interferometer 11 causes the divided optical signals to be supplied through the different optical paths and causes the signals to interfere with each other using a difference between the two optical paths. An example of the delay interferometer 11 includes an MZ interferometer.

The optical detectors PD1 and PD2 correspond to photodiodes which generate currents in accordance with reception-light powers of the input optical signals. For example, each of the optical detectors PD1 and PD2 generates a current in accordance with the reception-light power of the optical signal supplied from the delay interferometer 11 so as to determine presence or absence of the optical signal and intensity of the optical signal and obtain the optical signal. That is, a component of the intensity-modulation optical signal which is coherent light or a component of an optical signal which has not been subjected to phase modulation such as CW light is mainly output to one of the optical detectors PD1 and PD2, and an ASE component which is noncoherent light is output to both of the optical detectors PD1 and PD2. Note that, in this embodiment, the component of the signal light is mainly received by the optical detector PD2 and the ASE component is received by the optical detectors PD1 and PD2. That is, the reception-light power of the optical detector PD2 is larger than the reception-light power of the optical detector PD1.

The OSNR measurement device 20 measures an OSNR (optical signal-to-noise ratio) representing quality of a signal which has been supplied to the optical receiver 10. Especially, as shown in FIG. 2, the OSNR measurement device 20 is a calculator including a bandwidth monitor 21, an optical-power monitor 22, and an OSNR calculator 23.

The bandwidth monitor 21 obtains a bandwidth from the demultiplexer 2 which divides light received by the optical receiver 10 in accordance with a predetermined bandwidth. Specifically, the demultiplexer 2 includes the optical filter or the like in which the passband is set in advance so as to perform filtering on an optical signal output from the optical switch and supply the filtered optical signal to the optical receiver 10. Then, the bandwidth monitor 21 obtains a bandwidth "B (nm)" which has been set in the optical filter or the like included in the demultiplexer 2 and outputs the obtained bandwidth "B (nm)" to the OSNR calculator 23, which will be described hereinafter. Note that it is not necessarily the case that the bandwidth monitor 21 obtains a value of an actual measurement of the bandwidth from the demultiplexer 2, that is, the bandwidth monitor 21 may obtain a result of an actual measurement of the optical filter or a value of the predetermined bandwidth.

The optical-power monitor 22 obtains optical powers of optical signals received by the optical detectors (PD1 and PD2) which output currents in accordance with the optical powers of the optical signals output from the delay interferometer 11. Note that, in this embodiment, the component of the signal light is mainly received by the optical detector PD2 and the ASE component is received by the optical detectors PD1 and PD2. That is, the reception-light power of the optical detector PD2 is larger than the reception-light power of the optical detector PD1. Specifically, the optical detectors (PD1 and PD2) included in the optical receiver 10 output currents in accordance with optical powers of optical signals supplied from the delay interferometer 11. Then, the optical-power monitor 22 obtains average actual measurement values of optical powers "P1 (mW) and P2 (mW)" of optical signals received by the optical detectors (PD1 and PD2) and outputs the average actual measurement values to the OSNR calculator 23, which will be described hereinafter.

The OSNR calculator 23 measures an OSNR (optical signal-to-noise ratio) representing quality of a signal which has been supplied to the optical receiver 10. Specifically, the OSNR calculator 23 measures an optical signal-to-noise ratio (OSNR) by assigning the bandwidth "B (nm)" obtained by the bandwidth monitor 21 and the optical powers "P1 (mW) and P2 (mW)" obtained by the optical-power monitor 22 to Expression (2).

Expression (2)

$$OSNR[\text{dB}] = 10 \times \log(P2 - P1) - 10 \times \log\left(2 \times P1 \times \frac{0.1}{B}\right) \quad (2)$$

Process Performed by OSNR Measurement Device

Figure 3:
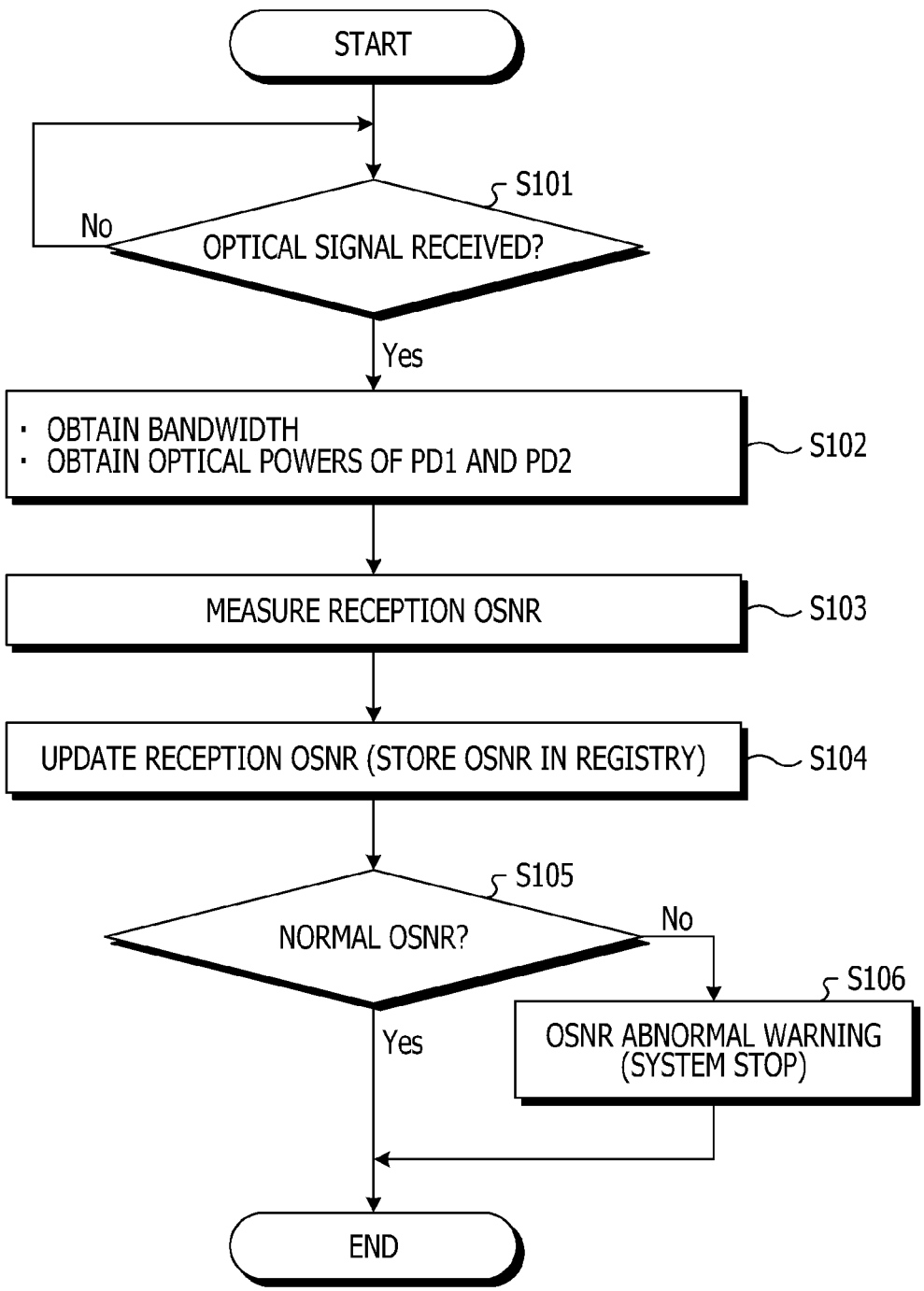
FIG. 3 illustrates an OSNR measurement process performed by the OSNR measurement device according to the first embodiment.

Referring now to FIG. 3, a method for performing an OSNR measurement process by the OSNR monitor including the OSNR measurement device according to the first embodiment will be described.

As shown in FIG. 3, when the optical receiver 10 received an optical signal output from the demultiplexer 2, (that is, when a determination is affirmative in operation S101), the OSNR measurement device 20 obtains a bandwidth "B(nm)" relating to a reception wavelength of the optical filter included in the demultiplexer 2 or the demultiplexer 2 (in operation S102). The bandwidth may be obtained from a network management system (NMS) or an element management system (EMS). Alternatively, the bandwidth monitor 21 may obtain a bandwidth of the optical filter included in the demultiplexer 2 or the demultiplexer 2 in accordance with an operation input performed by an operator. Furthermore, in operation S102, the OSNR measurement device 20 obtains optical powers of optical signals received by the optical detectors PD1 and PD2 and calculates averages of actual measurement values so as to obtain average optical powers "P1 (mW) and P2 (mW).

Then, the OSNR measurement device 20 assigns the obtained bandwidth "B (nm)" and the optical powers "P1 (mW) and P2 (mW)" to Expression (2) so as to measure an OSNR (reception OSNR) at a time of reception of the optical signal in operation S103.

Subsequently, the OSNR measurement device 20 stores the measured OSNR in a registry or the like (in operation S104), and determines whether the measured OSNR is equal to or larger than a predetermined threshold value, that is, whether the measured OSNR is a normal value (or within a predetermined range) (in operation S105). When it is determined that the measured OSNR is the normal value (or within the predetermined range) (that is, when the determination is affirmative in operation S105), the OSNR measurement device 20 continues operation.

On the other hand, when it is determined that the measured OSNR is not a normal value (that is, when the determination in negative in operation S105), the OSNR measurement device 20 outputs OSNR abnormal warning to a management device or the like and stops operation of a portion of the system which is associated with a portion which affects the reception wavelength where appropriate (in operation S106).

As described above, according to the first embodiment, information required for the OSNR measurement is obtained from the demultiplexer 2 and the optical detectors (PD1 and PD2) of the optical receiver 10 included in the optical communication system and the OSNR is measured. As a result, the OSNR is accurately measured without using an expensive optical spectrum analyzer.

Second Embodiment

In the first embodiment, the optical receiver 10 includes the delay interferometer 11 and the optical detectors (PD1 and PD2). However, the measurement of the OSNR disclosed in this application is not limited to this and receivers having various configurations may be employed.

In a second embodiment, an example of measurement of an OSNR using a receiver having function units different from the function units described in the first embodiment will be described. Note that the receiver of the second embodiment is also merely an example, and other receivers may be similarly employed.

Figure 4:
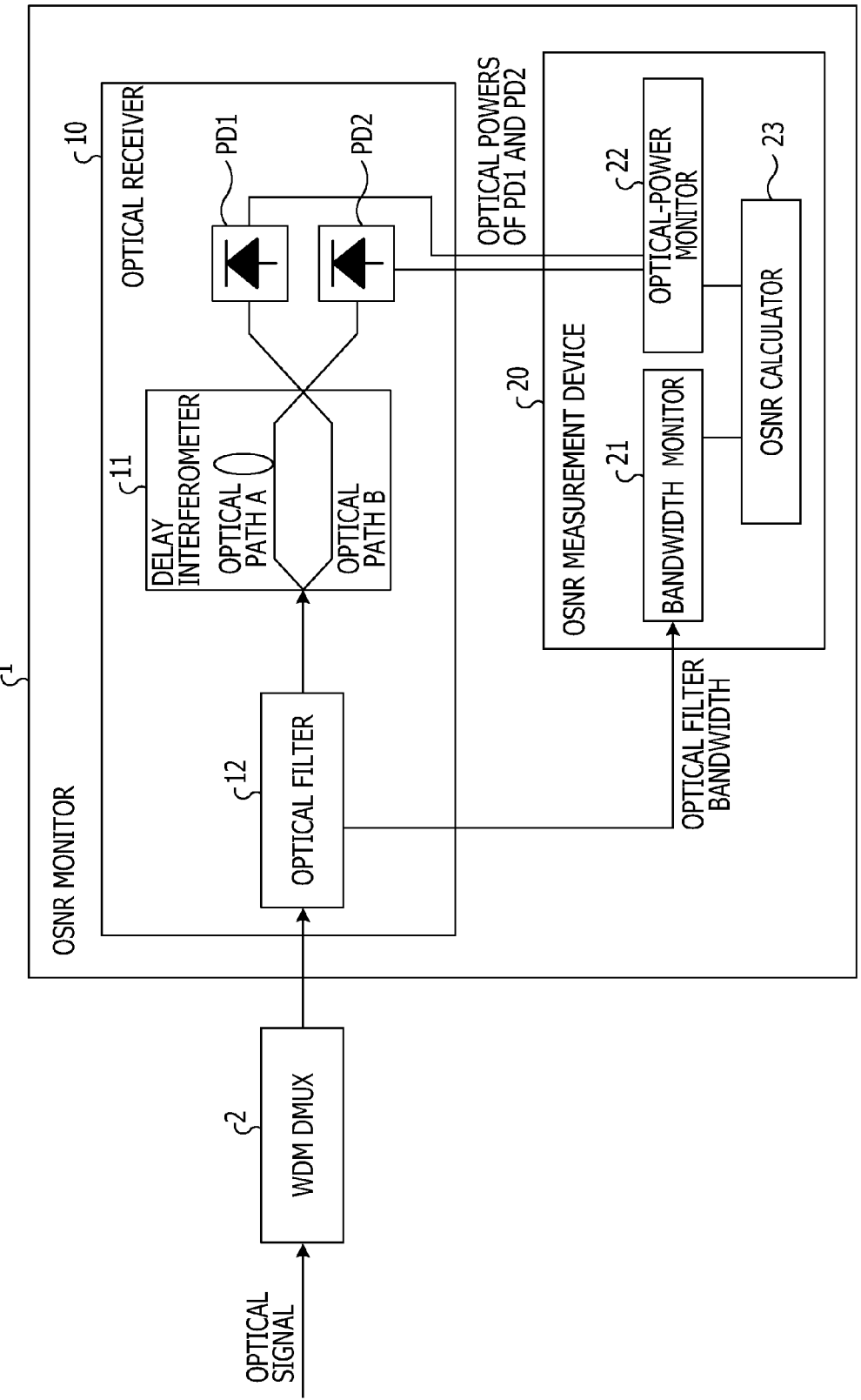
FIG. 4 illustrates a configuration of an OSNR monitor including an optical receiver including an optical filter according to a second embodiment.

For example, as shown in FIG. 4, an optical receiver 10 of an OSNR monitor 1 may include an optical filter 12 in addition to a delay interferometer 11 and optical detectors (PD1 and PD2). FIG. 4 illustrates the OSNR monitor 1 including an optical receiver including the optical filter 12.

The optical filter 12 corresponds to a band narrower than that of an optical filter included in a demultiplexer 2 so as to improve accuracy of the optical filter bandwidth. Specifically, the optical filter 12 having a predetermined bandwidth performs filtering on an optical signal output from the demultiplexer 2 and outputs the filtered optical signal to the delay interferometer 11. Note that examples of the narrow-band optical filter 12 include a bandpass filter, an interleaver, and an AWG (Arrayed-Waveguide Grating).

Unlike the first embodiment, a bandwidth monitor 21 of an OSNR measurement device 20 obtains the bandwidth "B (nm)" from the optical filter 12 and outputs the obtained bandwidth "B (nm)" to an OSNR calculator 23. Note that an optical-power monitor 22 and the OSNR calculator 23 have functions the same as those of the first embodiment, and therefore, descriptions thereof are omitted. Furthermore, the delay interferometer 11 and the optical detectors PD1 and PD2 included in the optical receiver 10 have functions the same as those of the first embodiment, and therefore, descriptions thereof are omitted.

Accordingly, even when the optical receiver 10 includes the optical filter 12, an OSNR is accurately measured without using an expensive optical spectrum analyzer. Furthermore, an OSNR is more accurately measured by actually measuring a bandwidth which has been set to the narrow-band optical filter 12.

Figure 5:
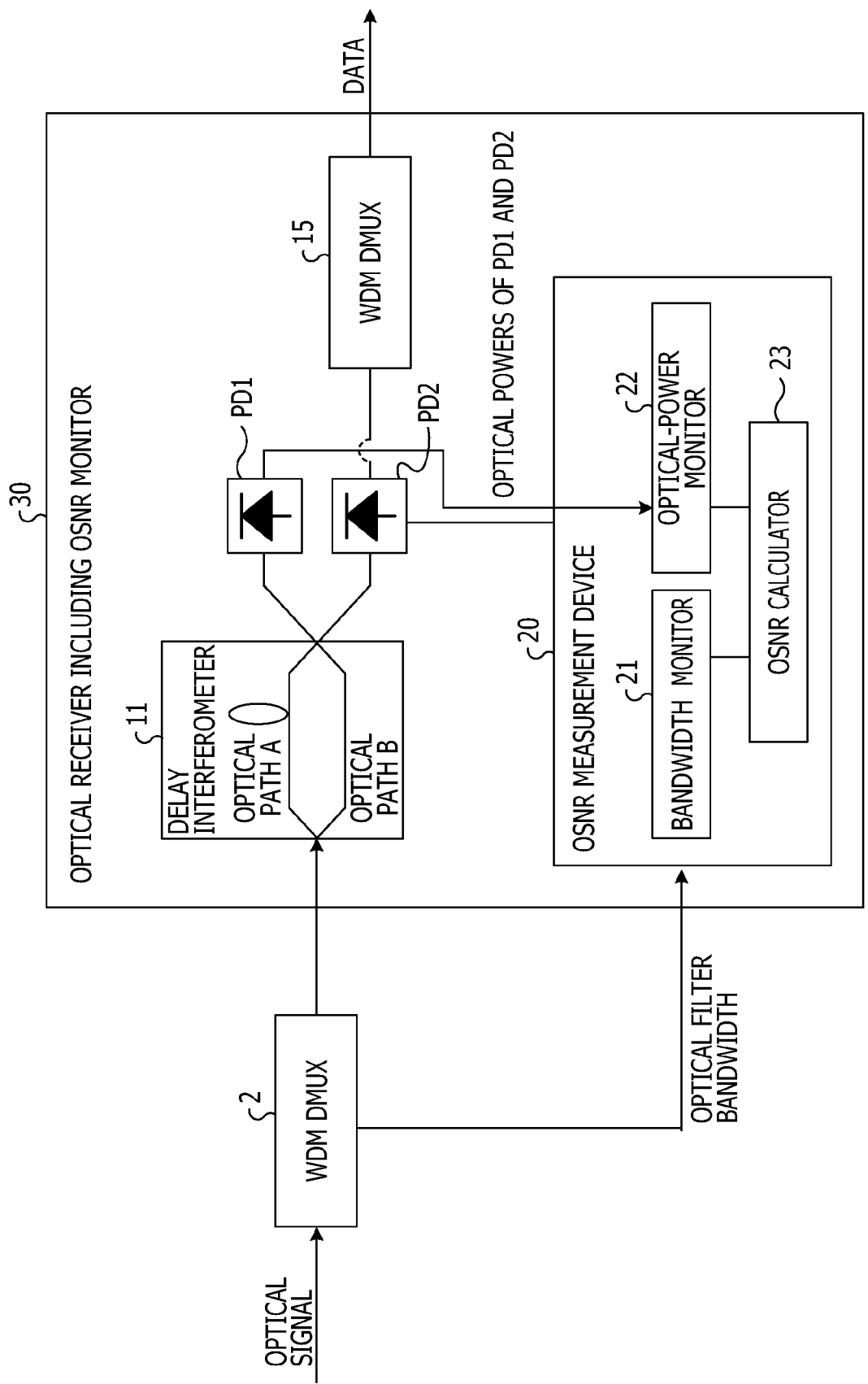
FIG. 5 illustrates a configuration example of a monitor used as a receiver.

Furthermore, as shown in FIG. 5, an amplifier 15 may be connected to an optical detector PD2 of an OSNR monitor 30 and the OSNR monitor 30 may be used as an ASK (OOK) receiver 30, for example. Note that "ASK" stands for "Amplitude Shift Keying", and "OOK" stands for "On-Off-Keying".

The receiver 30 including the OSNR monitor shown in FIG. 5 is connected to a demultiplexer 2 and includes a delay interferometer 11, an optical detector PD1, the optical detector PD2, the amplifier 15, and an OSNR measurement device 20. Note that the demultiplexer 2, the delay interferometer 11, the optical detectors PD1 and PD2, the OSNR measurement device 20 have functions the same as those of the first embodiment, and therefore, descriptions thereof are omitted.

The amplifier 15 connected to the optical detector PD2 amplifies a current (electric signal) output from the optical detector PD2 to a predetermined amplitude through voltage conversion, and outputs the amplified signal (DATA) to a discriminator or the like. By this, the receiver 30 may be used as the ASK (OOK) receiver. Furthermore, even when the receiver 30 is used as the ASK (OOK) receiver, an OSNR is accurately measured without using an expensive optical spectrum analyzer.

Third Embodiment

In the second embodiment, the configuration of the optical receiver 30 including the OSNR monitor is illustrated. However, this application is not limited to this configuration and optical receivers having various configurations may be employed.

Figure 6:
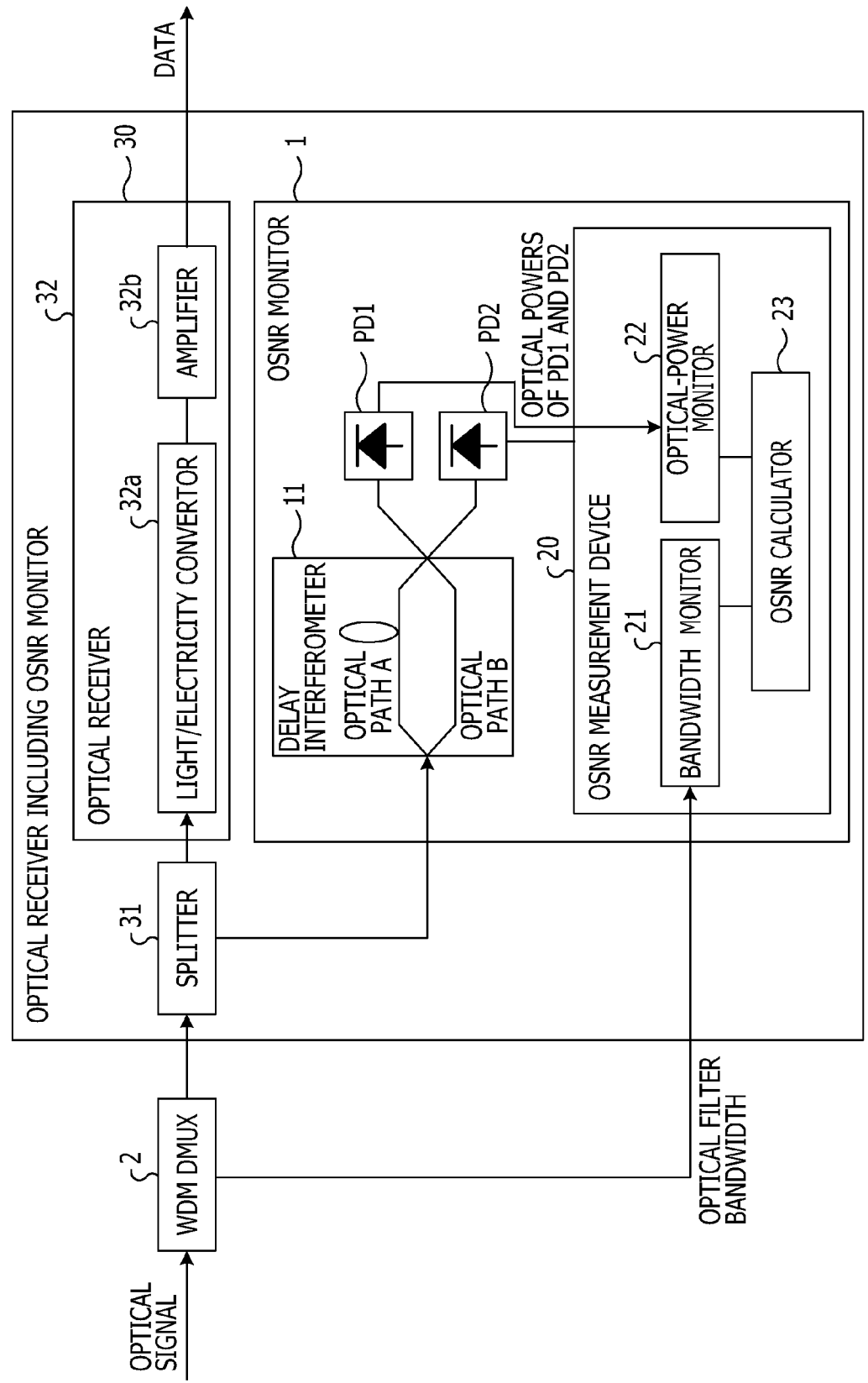
FIG. 6 illustrates an example of an optical receiver including an OSNR monitor according to a third embodiment.

For example, as shown in FIG. 6, an optical receiver 30 which is connected to a demultiplexer 2 and which includes a splitter 31, an optical receiver 32, and an OSNR monitor 1 may be employed.

In the optical receiver 30, an optical signal which has been subjected to filtering performed by the demultiplexer 2 having a function the same as that of the first embodiment is received by the splitter 31. The splitter 31 divides the received optical signal into two branches to be supplied to the optical receiver 32 and the OSNR monitor 1.

The OSNR monitor 1 includes a delay interferometer 11, optical detectors PD1 and PD2, and an OSNR measurement device 20 including a bandwidth monitor 21, an optical-power monitor 22, and an OSNR calculator 23. Functions of these components are the same as those of the first embodiment, and therefore, descriptions thereof are omitted.

The optical receiver 32 receives an optical signal supplied from the splitter 31 and outputs a signal. The optical receiver 32 mainly includes a light/electricity convertor 32a and an amplifier 32b. The light/electricity convertor 32a receives the optical signal supplied from the splitter 31, converts the received optical signal into an electric signal, and outputs the obtained electric signal to the amplifier 32b. The amplifier 32b amplifies the electric signal output from the light/electricity convertor 32a and outputs the amplified signal (DATA) to a discriminator or the like.

Figure 7:
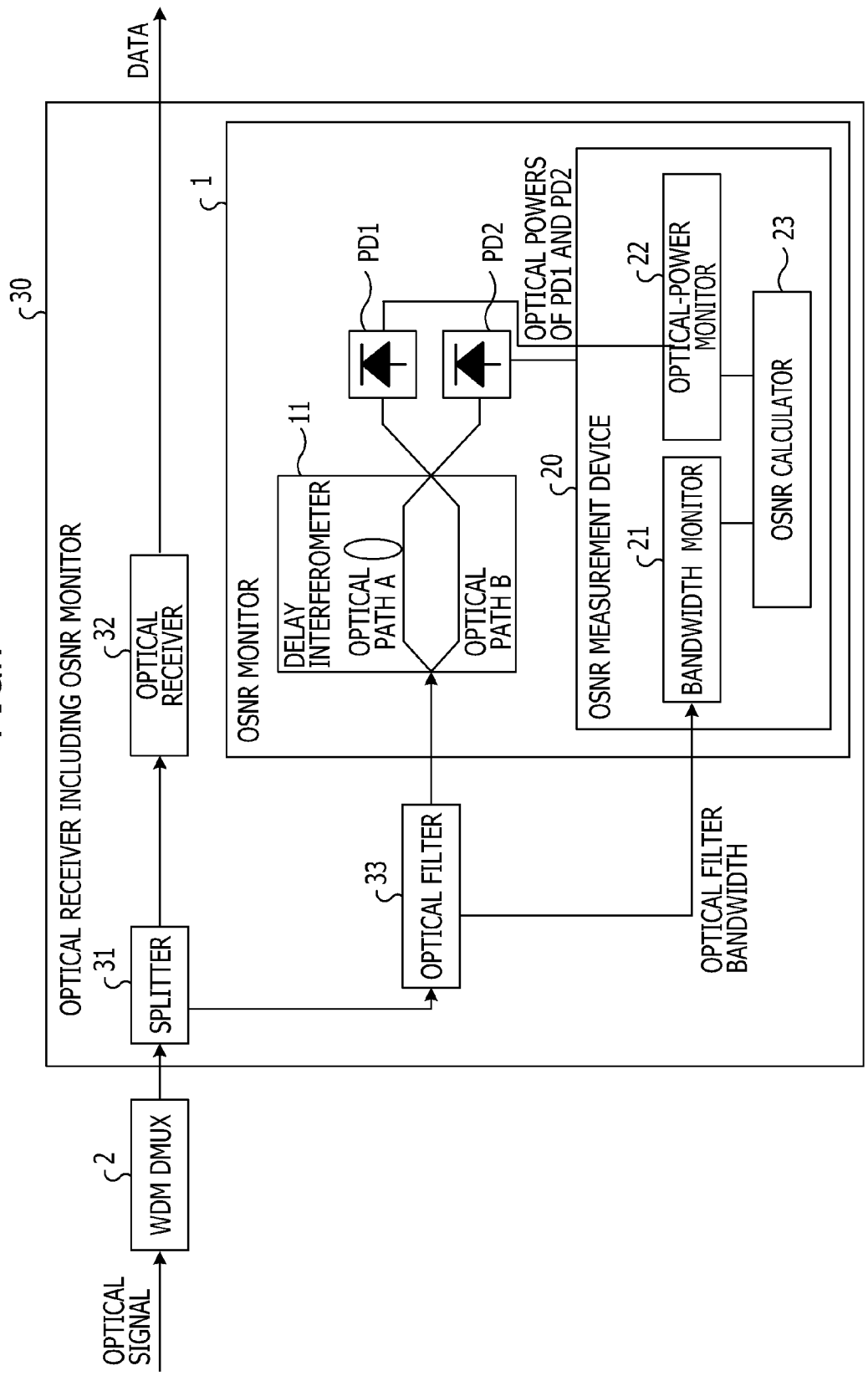
FIG. 7 illustrates an example of an optical receiver including an OSNR monitor which performs OSNR measurement using a result of optical filtering.

For example, as shown in FIG. 7, an optical signal divided by a splitter 31 which is the same as that shown in FIG. 6 may be subjected to filtering performed by an optical filter 33 so that an OSNR is measured. FIG. 7 illustrates an example of an optical receiver 30 including an OSNR monitor which performs an OSNR measurement using a result of optical filtering.

In this optical receiver 30, an optical signal filtered by a demultiplexer 2 having a function the same as that of the first embodiment is received by the splitter 31. The splitter 31 divides the received optical signal into two branches to be supplied to an optical receiver 32 and an optical filter 33.

As with the case of FIG. 6, the optical receiver 32 receives the optical signal supplied from the splitter 31, converts the received optical signal into an electric signal, amplifies the obtained electric signal, and outputs the amplified signal (DATA) to an discriminator or the like.

The optical filter 33 has a function the same as that of the optical filter 12 described in the second embodiment. The optical filter 33 corresponds to a band narrower than that corresponding to an optical filter of the demultiplexer 2 so that an accuracy of an optical filter bandwidth is more reliably improved. Specifically, the optical filter 33 having a predetermined bandwidth performs filtering on the optical signal output from the splitter 31, and outputs the passed optical signal to a delay interferometer 11 included in the OSNR monitor 1.

Then, as with the second embodiment, the bandwidth monitor 21 of the OSNR measurement device 20 obtains a bandwidth "B (nm)" from the optical filter 33 and outputs the obtained bandwidth "B (nm)" to an OSNR calculator 23. Note that an optical-power monitor 22 and the OSNR calculator 23 have functions the same as those of the first and second embodiment, and therefore, descriptions thereof are omitted. Furthermore, the delay interferometer 11 and optical detectors PD1 and PD2 included in the OSNR monitor 1 have functions the same as those of the first and second embodiments, and therefore, descriptions thereof are omitted.

As described above, even when the optical receivers 30 having the various configurations shown in FIGS. 6 and 7 are employed, as with the first and second embodiments, an OSNR is accurately measured without using an expensive optical spectrum analyzer.

Fourth Embodiment

In the first to third embodiments, the case where the OSNR is measured by receiving an optical signal which has not been subjected to phase modulation is described. However, this application is not limited to this. Even when an optical signal which has been subjected to phase modulation is received, an OSNR is similarly measured.

Accordingly, in a fourth embodiment, an example of OSNR measurement performed when an optical signal which has been subjected to phase modulation is received will be described. In the fourth embodiment, an optical communication system employing phase shift keying (such as an NRZ- DPSK method) as an optical modulation method different from an optical intensity modulation method will be described. Note that various modulation methods such as DPSK (Differential Phase Shift Keying) and DQPSK (Differential Quadrature Phase Shift Keying) may be employed instead of the NRZ-DPSK method.

As with the first embodiment, in the optical communication system according to the fourth embodiment, a plurality of ROADM nodes are connected to one another through a transmission path including an optical fiber, and inline amplifiers used to compensate for a loss of the transmission path are arranged between the adjacent ROADM nodes. Furthermore, each of the ROADM nodes includes a post amplifier on an output side (transmitter side) and a preamplifier on an input side (before a receiver). A demultiplexer, an optical switch, variable attenuators, and a multiplexer are arranged between the preamplifier and the post amplifier.

Furthermore, each of the ROADM nodes includes an OSNR monitor including a DPSK receiver which receives an optical signal which has been subjected to phase modulation and an OSNR measurement device which measures an OSNR. In such an OSNR monitor, it is not necessary that an optical signal power and an ASE power are separated from a signal spectrum at a time of signal modulation, and therefore, the OSNR is accurately measured.

Configuration of OSNR Monitor

Figure 8:
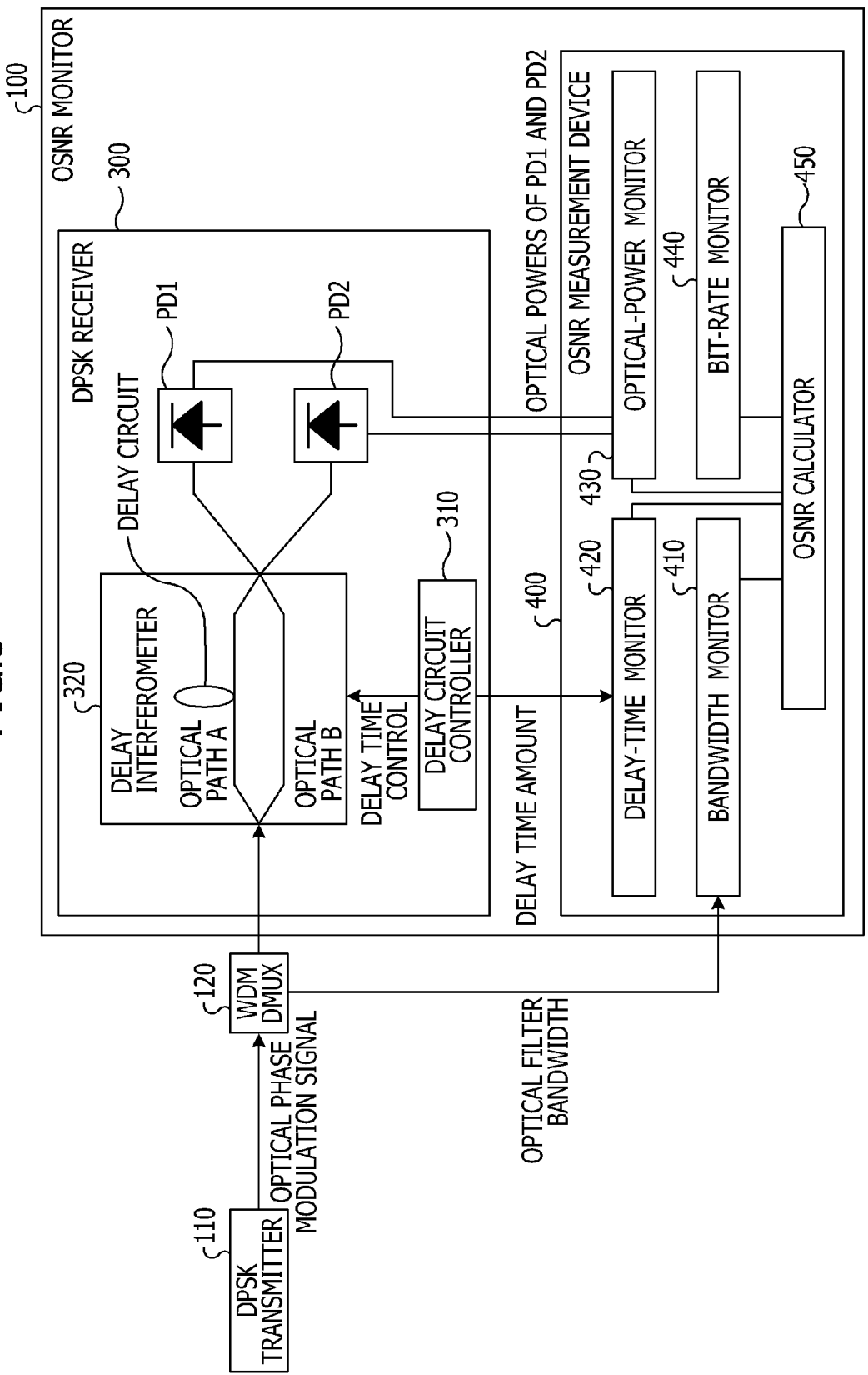
FIG. 8 illustrates a configuration of an OSNR monitor included in an optical communication system according to a fourth embodiment.

Next, a configuration of an OSNR monitor 100 of the optical communication system according to the fourth embodiment will be described with reference to FIG. 8. As shown in FIG. 8, the OSNR monitor 100 is connected to a DPSK transmitter 110 and a demultiplexer (WDM DMUX) 120. The OSNR monitor 100 includes a DPSK receiver 300 and an OSNR measurement device 400.

Configuration of DPSK Transmitter

Figure 9:
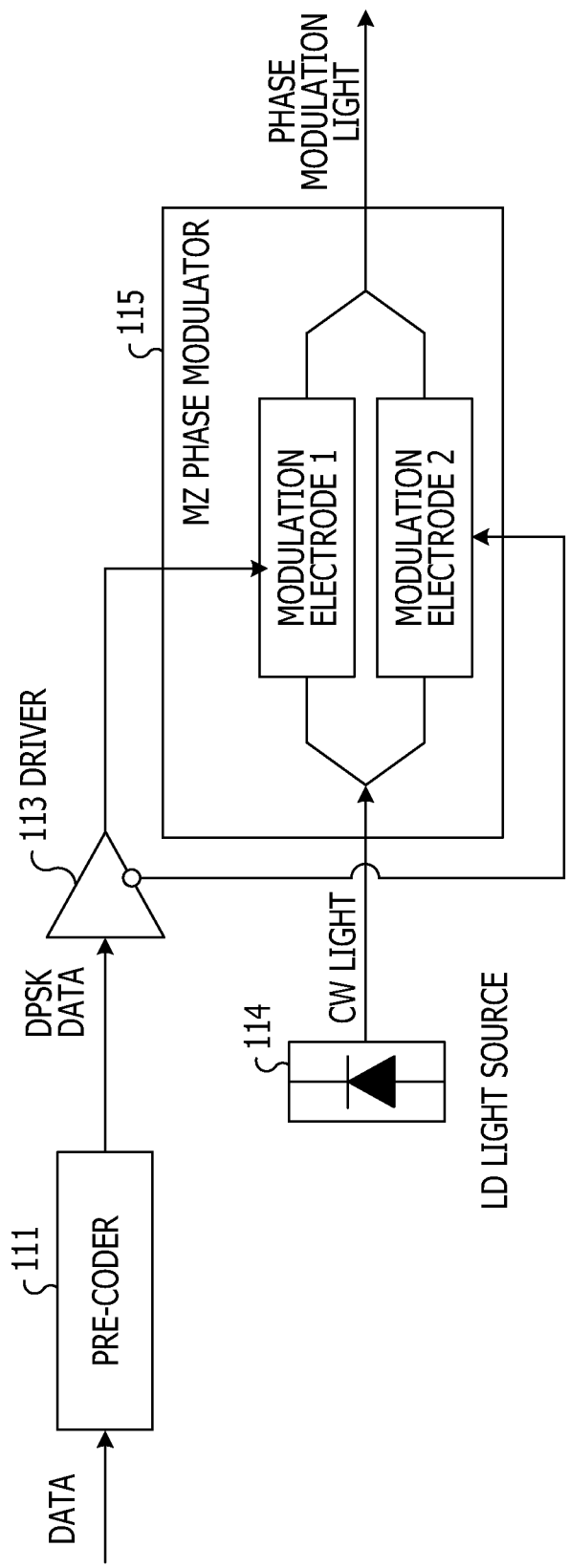
FIG. 9 illustrates a configuration of a DPSK transmitter.

As shown in FIG. 9, the DPSK transmitter 110 employs the NRZ-DPSK modulation method and includes a pre-coder 111, a driver 113, an LD light source 114, and an MZ phase modulator 115. FIG. 9 illustrates a configuration of the DPSK transmitter 110.

When a code different from a code of a preceding bit appears in data input from the optical switch, the pre-coder 111 serving as a logic circuit inverts the code of the preceding bit and outputs the inverted code to the driver 113, and otherwise, the pre-coder 111 outputs a code the same as the code of the preceding bit to the driver 113. The LD light source 114 which is a semiconductor laser diode outputs CW light which is monochromatic continuous light to the MZ phase modulator 115.

The driver 113 performs voltage conversion on the code output from the pre-coder 111 before the MZ phase modulator 115 performs modulation on the code. For example, when a code input to the pre-coder 111 corresponds to "1", the driver 113 outputs voltages to modulation terminals of the MZ phase modulator 115 so that an optical phase of an optical output signal output from the MZ phase modulator 115 is modulated from "0" radian to "π" radian. On the other hand, when the code input to the pre-coder 111 corresponds to "0", the driver 113 outputs voltages to the modulation terminals of the MZ phase modulator 115 so that the optical phase of the optical output signal output from the MZ phase modulator 115 of "0" radian remains. Note that the notation of "0" radian and the notation of "π" radian may be replaced by each other.

The MZ (Mach-Zehnder) phase modulator 115 includes first and second modulation electrodes. The MZ phase modulator 115 changes a refractive index of an optical waveguide using a line of electric force extending from one of the modulation electrodes corresponding to a voltage applied by the driver 113 to a ground electrode, generates phase modulation light by performing phase modulation on input light, and outputs the phase modulation light to the multiplexer (WDM DMUX).

Figure 10:
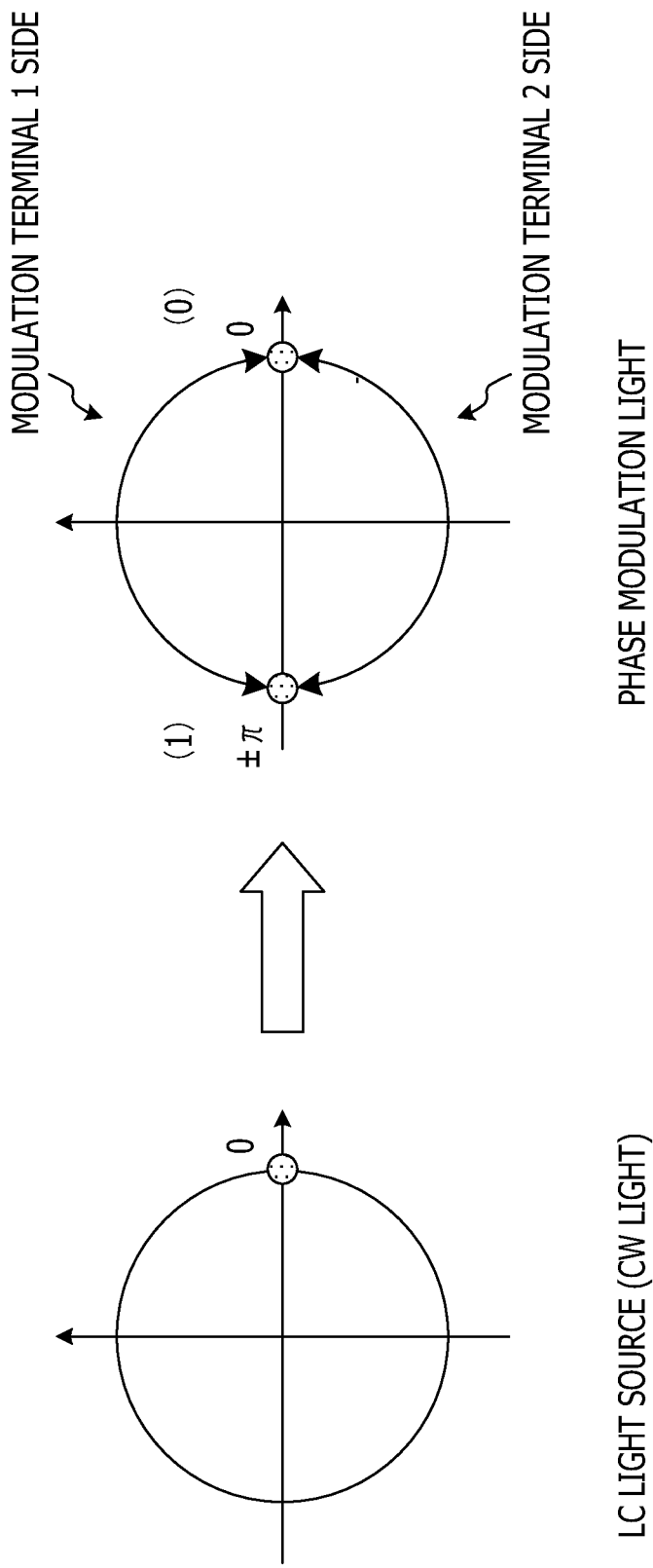
FIG. 10 illustrates states of phases of an LD light source and a phase modulation light.
Figure 11:
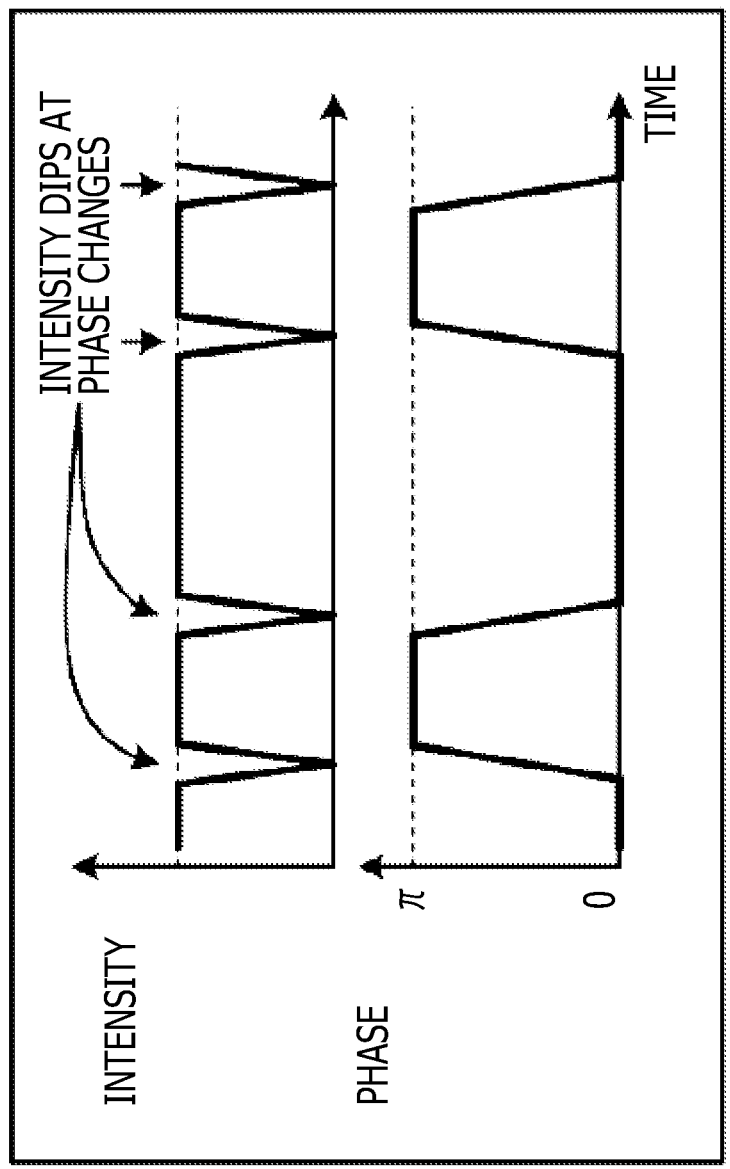
FIG. 11 illustrates the relationship between a phase change and an optical output.

Referring now to FIGS. 10 and 11, the relationship between the CW light output from the LD light source 114 and the phase modulation light output from the MZ phase modulator 115 will be described. FIG. 10 illustrates states of phases of the LD light source and the phase modulation light. FIG. 11 illustrates the relationship between a phase change and an optical output. Note that, in FIG. 10, axis of abscissa denotes a phase, an axis of ordinate denotes a voltage, and a distance from an original represents an electric field intensity.

As shown in FIG. 10, the CW light emitted from the LD light source 114 with a reference power in which a phase thereof has not been determined is divided into branches to be supplied to the first and second modulation terminals of the MZ phase modulator 115. Then, an intensity of the CW light represented by a distance from the original is not changed irrespective of the voltage applied by the driver 113, but only a phase thereof is modulated in a range from "0" radian, a quenching state, to "π" radian. Furthermore, when phase modulation light beams obtained through phase modulation performed by the first and second modulation terminals of the MZ phase modulator 115 are added to each other, a component of the axis of ordinate is cancelled, and only a component of the axis of abscissa remains. That is, the phase modulation light beams which have been subjected to the phase modulation by the first and second modulation terminals have fixed intensities irrespective of a phase type.

Then, as shown in FIG. 11, although the phase modulation light output from the MZ phase modulator 115 is modulated in a range from "0" radian, the quenching state, to "π" radian, a light intensity is changed at rising edges or trailing edges of the phase. That is, the phase modulation light output from the MZ phase modulator 115 has a fixed light intensity irrespective of whether the phase thereof is modulated to "0" or "π".

Configuration of Demultiplexer

Referring back to FIG. 8, the demultiplexer 120 will be described. The demultiplexer 120 serves as an optical wavelength division multiplexing demultiplexer (WDM DMUX) which demultiplexes the phase modulation signal obtained by performing the phase modulation on the light received by the optical switch (refer to FIG. 1) in accordance with a predetermined bandwidth. Specifically, the demultiplexer 120 includes an optical filter having a predetermined passband, and performs filtering on the phase modulation light output from the MZ phase modulator 115. Then, the demultiplexer 120 outputs an optical signal (an optical signal (a portion except for noise)+ASE (a noise portion)) obtained through the filtering performed by the optical filter to the DPSK receiver 300.

Configuration of DPSK Receiver

The DPSK receiver 300 employs the NRZ-DPSK modulation method and includes, as shown in FIG. 8, a delay circuit controller 310, a delay interferometer 320, and optical detectors PD1 and PD2.

The delay circuit controller 310 controls a delay time of a delay circuit included in the delay interferometer 320. For example, a user inputs a delay time, and the input delay time is set to the delay circuit.

The delay interferometer 320 divides a signal which has been subjected to the demultiplexing performed by the demultiplexer 120 into two signals, causes one of the signals which has been delayed by a predetermined time amount to interfere with the other of the signals which has not been delayed, and outputs the signals to the optical detectors PD1 and PD2 which output currents. Specifically, the delay interferometer 320 divides an optical signal supplied from the demultiplexer 120 into two signals to be supplied to optical paths A and B. Then, the delay interferometer 320 delays the optical signal of the optical path A by τ seconds, causes the optical signals of the optical paths A and B to interfere with each other, and outputs the optical signals to the optical detectors PD1 and PD2. Here, the delay interferometer 320 operates such that a current is supplied to the optical detector PD1 when a difference between optical phases of the optical paths A and B corresponds to "π" radian whereas a current is supplied to the optical detector PD2 when the difference corresponds to "0" radian.

Specifically, when the value τ is equal to 0 (second), a current is substantially supplied only to the optical detector PD2 since the optical phase difference is not generated between the optical paths A and B. When the value τ is increased, a rate at which the optical phase difference corresponds to "π" relative to a preceding bit is increased, and accordingly, the current supplied to the optical detector PD1 is increased. On the other hand, when the value τ is equal to 1 bit (second), that is, at a time of a delay of 100%, the currents supplied to the optical detectors PD1 and PD2 are substantially equal to each other when a mark ratio (a ratio of a code "1" relative to all codes) of an output from the pre-coder 111 of the DPSK transmitter 110 is 50%.

Here, referring to FIG. 12, the relationships between output optical phases of the optical paths A and B and output states of the optical detectors PD1 and PD2 will be described. Note that, in FIG. 12, an axis of abscissa denotes time (axis), and dotted lines denote time (axis) corresponding to one bit.

Figure 12:
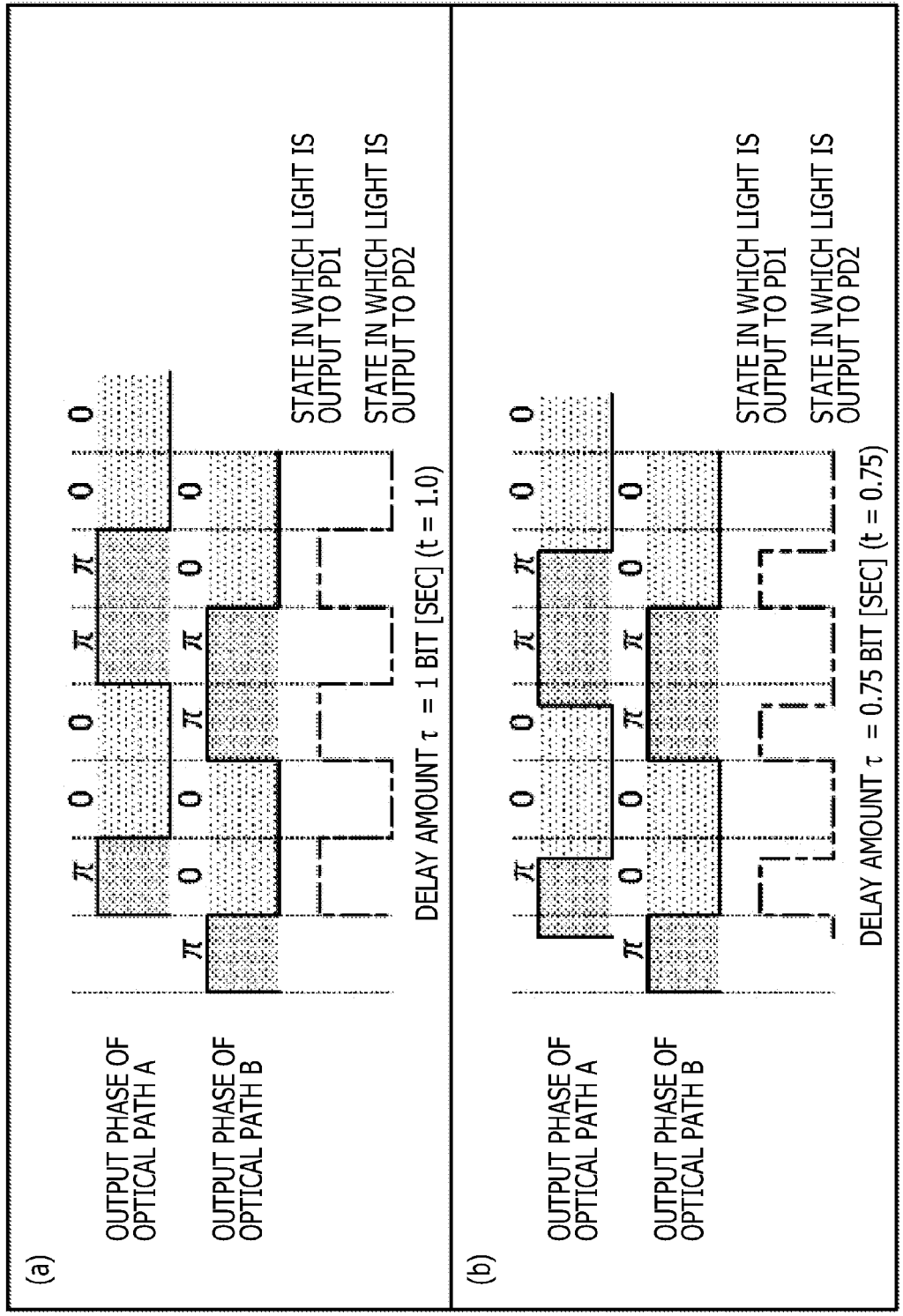
FIG. 12 illustrates output phases of optical paths A and B and transitions of states of light beams output to optical detectors.

When a delay amount τ between the optical paths A and B corresponds to "1 bit (second)" and when an optical phase difference between the optical paths A and B corresponds to "π", as shown in (a) of FIG. 12, the same amounts of currents are supplied to the optical detectors PD1 and PD2. That is, when an output phase of the optical path A and an output phase of the optical path B are shifted from each other by "1 bit (second)", the same amounts of currents are supplied to the optical detectors PD1 and PD2. On the other hand, when the delay amount τ between the optical paths A and B is larger than 0 and smaller than 1, e.g., when the delay amount τ is "0.75 bits (seconds)", that is, when an inter-symbol phase difference τ between the optical paths A and B is "0.75 bits (seconds)", as shown in (b) of FIG. 12, the amount of the current supplied to the optical detector PD2 is larger than the amount of the current supplied to the optical detector PD1. That is, when an output symbol phase of the optical path A is shifted relative to an output symbol phase of the optical path B by "0.75 bits (seconds)", the amount of the current supplied to the optical detector PD2 is larger than the amount of the current supplied to the optical detector PD1.

That is, as the delay amount τ between the optical paths A and B is shifted from "1 bit (second)" to "0 bit (second)", the amount of the current supplied to the optical detector PD2 becomes larger than the amount of the current supplied to the optical detector PD1, and when the delay amount τ between the optical paths A and B becomes "0 bit (second)", the current is supplied only to the optical detector PD2 since the optical phase difference between the optical paths A and B is not generated. Accordingly, in the signal light, the amounts of the currents supplied to the optical detectors PD1 and PD2 depend on the delay amount τ and the optical phase difference between the optical paths A and B.

Referring back to FIG. 8, the optical detectors PD1 and PD2 are photodiodes which generate currents corresponding to reception-light powers of input optical signals. For example, the optical detectors PD1 and PD2 generate currents in accordance with reception-light powers of optical signals supplied from the delay interferometer 320.

The delay time of the delay interferometer 320 is set so that a delay time difference is obtained so that interference of the ASE light does not occur. That is, the optical signals of the optical paths A and B interfere with each other in the delay interferometer 320 since the optical signal has coherency, and therefore, a difference between optical levels of the optical detectors PD1 and PD2 is generated in accordance with a state of the interference. However, since the ASE light does not have coherency, the optical detectors PD1 and PD2 receives light beams with the substantially the same optical levels.

Specifically, ASE light beams having the substantially the same optical levels are received by the optical detectors PD1 and PD2, and signal lights having different levels are received by the optical detectors PD1 and PD2 in accordance with the interference state of the delay interferometer 320. An OSNR is obtained by calculating this characteristic using an OSNR calculator.

Configuration of OSNR Measurement Device

As shown in FIG. 8, the OSNR measurement device 400 is a calculator including a bandwidth monitor 410, a delay-time monitor 420, an optical-power monitor 430, a bit-rate monitor 440, and an OSNR calculator 450.

Figure 13:
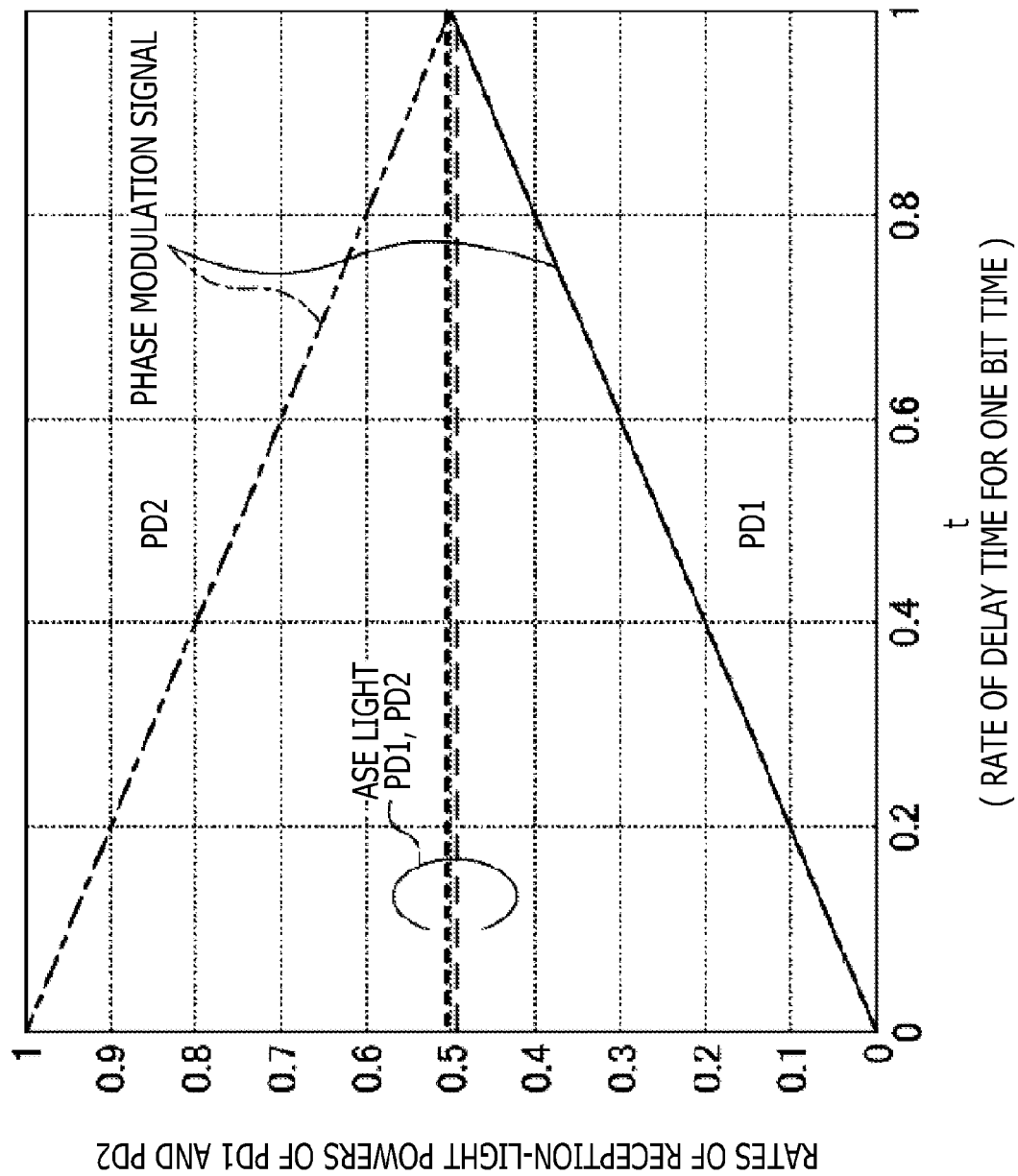
FIG. 13 illustrates the relationship among a rate t of a delay time for one bit time, phase modulation signals received by the optical detectors, and an ASE.

Note that, before the function units are described, calculation formulas used for an OSNR calculation performed by the OSNR measurement device 400 will be described. As described above, currents supplied to the optical detectors PD1 and PD2 depend on the delay amount τ between the optical paths A and B (i.e., a rate of a delay time for one bit time) and the optical phase difference. On the other hand, since the ASE does not have phase information and coherency, the ASE light does not depend on the delay amount τ, and the currents supplied to the optical paths A and B are equal to each other. Accordingly, characteristics of the differential phase shift keying method representing that "amounts of the currents supplied to the optical detectors PD1 and PD2 are different from each other when the delay amount τ is equal to or smaller than 1 bit (second)" and "the ASE does not depend on the delay amount τ and amounts of the currents supplied to the optical detectors PD1 and PD2 are equal to each other" are used for the OSNR calculation (measurement). FIG. 13 illustrates the relationship among a rate t of the delay time for one bit time, phase modulation signals received by the optical detectors PD1 and PD2, and the ASE.

As shown in FIG. 13, the ASE received by the optical detectors PD1 and PD2 is fixed to 0.5 irrespective of the delay time except for a case where the rate t of the delay time for one bit time is equal to 0. On the other hand, as for phase modulation signal light beams received by the optical detectors PD1 and PD2, as the rate t of the delay time relative to one bit time is increased from "0" to "1", a reception-light power of the optical detector PD2 becomes smaller (the current supplied to the optical detector PD2 is reduced) and a reception-light power of the optical detector PD1 becomes larger (the current supplied to the optical detector PD1 is increased). As a result, when the rate t corresponds to "1", the reception-light powers of the optical detectors PD1 and PD2 are equal to each other, that is, "0.5". Accordingly, when the optical powers received by the optical detectors PD1 and PD2 are denoted by P1 (mW) and P2 (mW), an optical signal power is denoted by Psig (mW), and an ASE total power is denoted by Pase,total (mW), Equations (3) and (4) below are satisfied with reference to the relationship shown in FIG. 13.

Expression (3)

$$P1 = 0.5 \times t \times P_{sig} + 0.5 \times P_{ase,\text{total}} \quad (3)$$

Expression (4)

$$P2 = (1 - 0.5 \times t) \times P_{sig} + 0.5 \times P_{ase,\text{total}} \quad (4)$$

Note that, "t" denotes the rate of the delay time for one bit time, and accordingly, when the optical signal power Psig is calculated using Expressions (3) and (4), Expression (5) is satisfied. Furthermore, according to Expression (6), the ASE total power Pase,total is represented by Expression (7).

Expression (5)

$$P_{sig} = \frac{P2 - P1}{1 - t} \quad (5)$$

Expression (6)

$$P1 + P2 = P_{sig} + P_{ase,\text{total}} \quad (6)$$

Expression (7)

$$P_{ase,\text{total}} = P1 + P2 - P_{sig} = P1 + P2 - \frac{P2 - P1}{1 - t} \quad (7)$$

When a band of the ASE included in Expression (7) is set to B (nm) and an ASE power of 0.1 nm band is calculated, Expression (8) is obtained. Furthermore, according to Expressions (1), (5), and (8), an OSNR to be obtained is calculated using Expression (9).

Expression (8)

$$P_{ase}, 0.1 \text{ nm} = \left(P1 + P2 - \frac{P2 - P1}{1 - t}\right) \times \frac{0.1}{B} \quad (8)$$

Expression (9)

$$OSNR[\text{dB}] = 10 \times \log\left(\frac{P2 - P1}{1 - t}\right) - 10 \times \log\left[\left(P1 + P2 - \frac{P2 - P1}{1 - t}\right) \times \frac{0.1}{B}\right] \quad (9)$$

FIGS. 14A to 14E illustrate the relationships between the OSNR (dB) obtained using Expression (9) and the reception-light powers P1 (dBm) and P2 (dBm) of the optical detectors PD1 and PD2 when an ASE band B is equal to 0.6 (nm) and the rate t of the delay time for one bit time is changed within a range from 0.8 to 0. As shown in FIGS. 14A to 14E, as the OSNR increases, a difference between the reception-light powers P1 and P2 becomes large. Furthermore, when the rate t becomes smaller, the difference between the reception-light powers P1 and P2 becomes large.

FIG. 15 illustrates the relationship between the OSNR and a difference ΔP (dB)=[P2 (dBm)–P1 (dBm)] between the reception-light powers P1 and P2 obtained in accordance with the relationship among the OSNR (dB) and the reception-light powers P1 (dBm) P2 (dBm) of the optical detectors PD1 and PD2. As shown in FIG. 15, the OSNR is measured by obtaining the difference ΔP. Accordingly, the OSNR measurement device 400 obtains various information required for the calculation of Expression (9) and assigns the information to Expression (9) to thereby measure the OSNR.

Figure 14A:
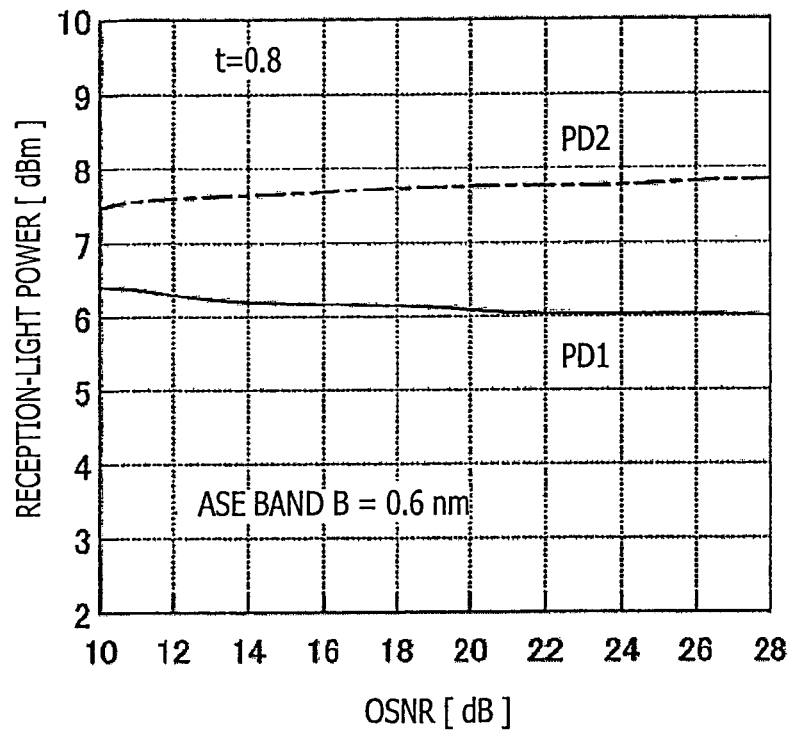
FIG. 14A illustrates the relationship between an OSNR obtained when a rate t of a delay time for one bit time is set to 0.8 and reception-light powers of the optical detectors.
Figure 14B:
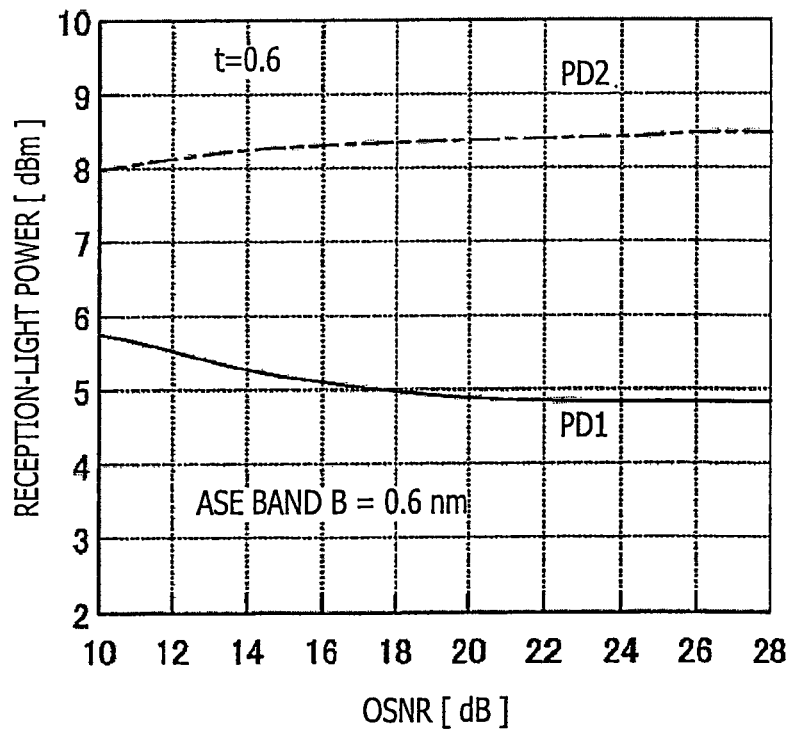
FIG. 14B illustrates the relationship between an OSNR obtained when a rate t of a delay time for one bit time is set to 0.6 and reception-light powers of the optical detectors.
Figure 14C:
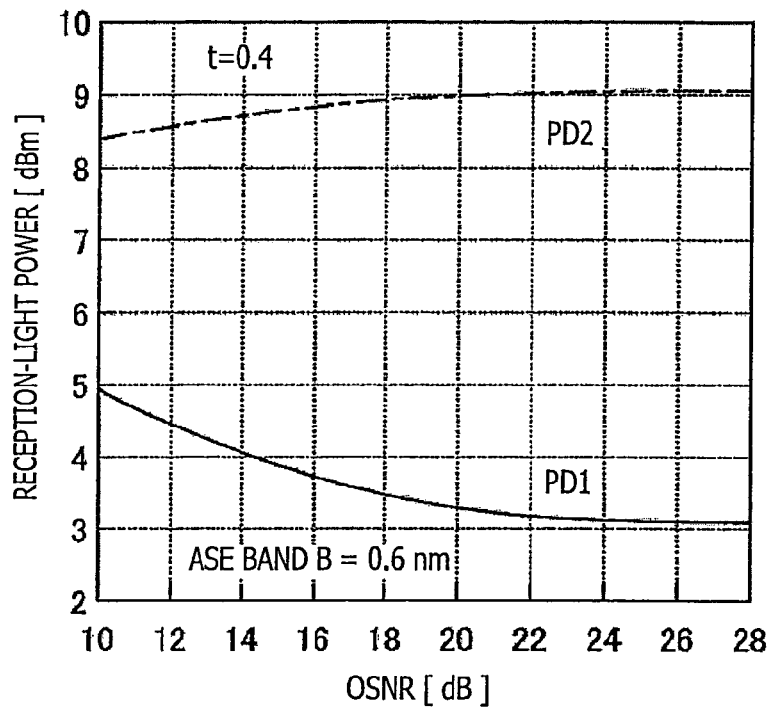
FIG. 14C illustrates the relationship between an OSNR obtained when a rate t of a delay time for one bit time is set to 0.4 and reception-light powers of the optical detectors.
Figure 14D:
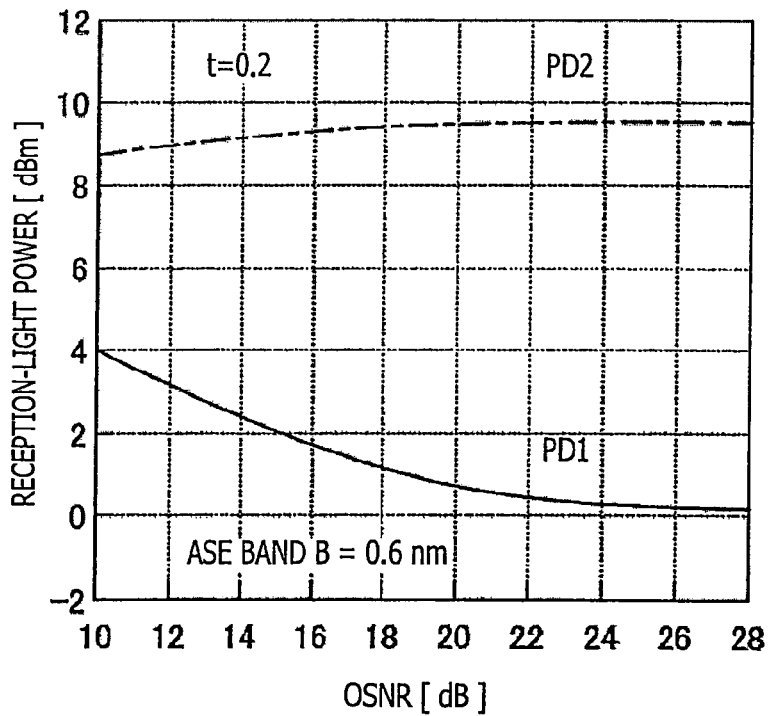
FIG. 14D illustrates the relationship between an OSNR obtained when a rate t of a delay time for one bit time is set to 0.2 and reception-light powers of the optical detectors.

Note that FIG. 14A illustrates the relationship between the OSNR obtained when the rate t of the delay time for one bit time is set to 0.8 and the reception-light powers of the optical detectors PD1 and PD2. FIG. 14B illustrates the relationship between the OSNR obtained when the rate t of the delay time for one bit time is set to 0.6 and the reception-light powers of optical detectors PD1 and PD2. FIG. 14C illustrates the relationship between the OSNR obtained when the rate t of the delay time for one bit time is set to 0.4 and the reception-light powers of the optical detectors PD1 and PD2. FIG. 14D illustrates the relationship between the OSNR obtained when the rate t of the delay time for one bit time is set to 0.2 and the reception-light powers of the optical detectors PD1 and PD2. FIG. 14E illustrates the relationship between the OSNR obtained when the rate t of the delay time for one bit time is set to 0 and the reception-light powers of the optical detectors PD1 and PD2. FIG. 15 illustrates the relationship between the OSNR and the difference ΔP between optical detector PD1 and PD2.

Referring back to FIG. 8, the configuration of the OSNR measurement device 400 will be described. As described above, the OSNR measurement device 400 is the calculator including the bandwidth monitor 410, the delay-time monitor 420, the optical-power monitor 430, the bit-rate monitor 440, and the OSNR calculator 450. Note that the OSNR measurement device 400 may be configured using an FPGA (Field Programmable Gate Array) or an ASIC (Application Specific Integrated Circuit) as a calculator.

The bandwidth monitor 410 obtains a bandwidth from the demultiplexer 120 which demultiplexes a phase modulation signal supplied from the DPSK transmitter 110 in accordance with the predetermined bandwidth. Specifically, the DPSK transmitter 110 performs phase modulation on light received by an optical switch and outputs the light to the demultiplexer 120. The demultiplexer 120 includes an optical filter or the like in which a passband is set in advance and performs filtering on phase modulation light output from the MZ phase modulator 115 included in the DPSK transmitter 110. Then, the bandwidth monitor 410 obtains the bandwidth "B (nm)" set in the optical filter or the like included in the demultiplexer 120 and outputs the bandwidth "B (nm)" to the OSNR calculator 450.

Note that it is not necessary that the bandwidth monitor 410 obtains an actual measurement value of the bandwidth from the demultiplexer 120. The bandwidth monitor 410 may obtain an actual measurement result of the optical filter or may use a value of the given bandwidth.

The delay-time monitor 420 obtains a delay time amount from the delay interferometer 320 which divides a signal obtained through demultiplexing performed by the demultiplexer 120, which causes one of the signal which has been delayed by a predetermined time amount to interfere with the other of the signals which has not been delayed, and which outputs the signals to the optical detectors PD1 and PD2 which output currents. Specifically, the delay interferometer 320 divides a phase modulation signal which has been obtained through the demultiplexing performed by the demultiplexer 120 into two signals to be supplied to the optical paths A and B, and delays the phase modulation signal supplied to the optical path A by the delay time amount determined by the delay circuit controller 310. Then, the delay interferometer 320 causes the signals output from the optical paths A and B to interfere with each other, and outputs the signals to the optical detectors PD1 and PD2. Then, the delay-time monitor 420 obtains the delay time "τ (second)" determined by the delay circuit controller 310 from the delay circuit controller 310 or the delay interferometer 320 and outputs the delay time "τ (second)" to the OSNR calculator 450 which will be described hereinafter.

The optical-power monitor 430 obtains optical powers of the optical signals received by the optical detectors (PD1 and PD2) of the DPSK receiver 300 which output currents in accordance with the reception-light powers of the optical signals supplied from the delay interferometer 320. Specifically, the optical detectors PD1 and PD2 generates currents in accordance with the reception-light powers of the optical signals (phase modulation signals) output from the delay interferometer 320 so that the optical-power monitor 430 detects the optical signals or intensities of the optical signals or obtains the optical signals. Then, the optical-power monitor 430 obtains average measurement values of the optical powers "P1 (mW) and P2 (mW)" of the optical signals received by the optical detectors (optical detectors PD1 and PD2) and outputs the average measurement values to the OSNR calculator 450 which will be described hereinafter.

The bit-rate monitor 440 outputs a bit rate "F (bps)" determined in advance by an administrator from a memory or the like and outputs the bit rate "F (bps)" to the OSNR calculator 450.

The OSNR calculator 450 measures an optical signal-to-noise ratio (OSNR) based on the bandwidth obtained by the bandwidth monitor 410, the delay time amount obtained by the delay-time monitor 420, the optical powers obtained by the optical-power monitor 430, and the bit rate obtained by the bit-rate monitor 440. Specifically, the OSNR calculator 450 calculates the rate t of the delay time for one bit time "t=τ/(1/F)=τ×F" using the delay time amount "τ (second)" obtained by the delay-time monitor 420 and the bit rate "F (bps)" obtained by the bit-rate monitor 440. Then, the OSNR calculator 450 assigns the bandwidth "B (nm)", the delay time amount "τ (second)", the optical powers "P1 (mW) and P2 (mW)", and the rate "t" of the delay time for one bit time obtained by the control circuits described above to Expression (9) to thereby measure the OSNR. Thereafter, the OSNR calculator 450 outputs the measured OSNR to a management device or the like.

Process Performed by OSNR Monitor

Figure 16:
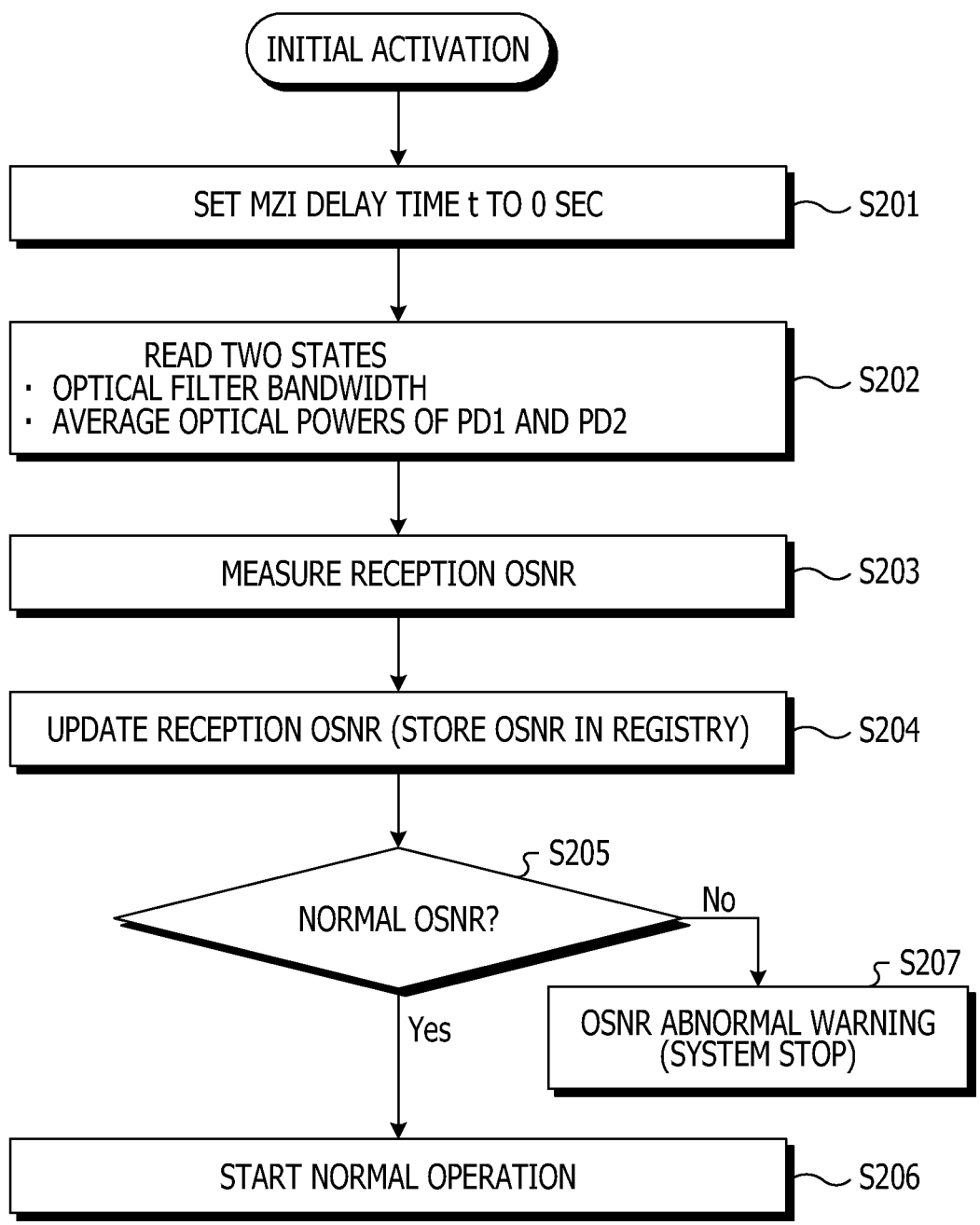
FIG. 16 illustrates an OSNR measurement process performed by the OSNR monitor according to the fourth embodiment before normal operation is performed.
Figure 17:
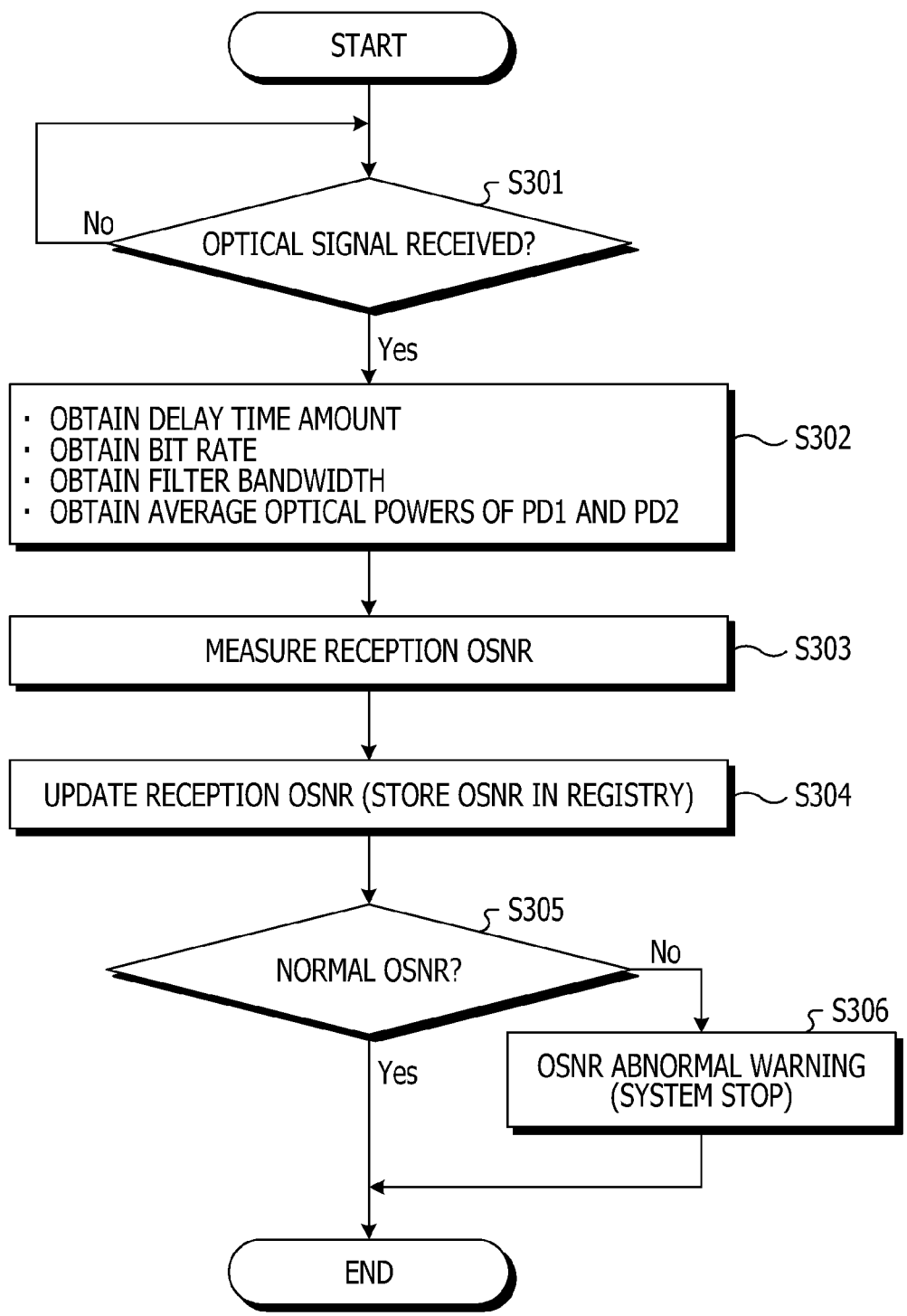
FIG. 17 illustrates the OSNR measurement process performed by the OSNR monitor according to the fourth embodiment when the normal operation is performed.

Referring now to FIGS. 16 and 17, an OSNR measurement process performed by the OSNR monitor according to the fourth embodiment will be described. FIG. 16 illustrates an OSNR measurement process performed by the OSNR monitor according to the fourth embodiment before the OSNR monitor performs operation. FIG. 17 illustrates the OSNR measurement process performed by the OSNR monitor according to the fourth embodiment when the OSNR monitor performs a normal operation.

Flow of OSNR Measurement Process before Operation

First, the OSNR monitor 100 operates the delay circuit controller 310 included in the DPSK receiver 300 so that a delay time of a delay circuit included in the delay interferometer 320 corresponds to 0 (in operation S201). Note that when the delay time of the delay interferometer 320 corresponds to 0, "t=0" is satisfied according to Expression (9) and information on the delay time of the delay interferometer 320 and information on the bit rate of the optical signal are not required. According to FIG. 15, when the rate t of the delay time is equal to 0, a dynamic range of the OSNR monitor 100 is large, and high accuracy is attained. However, while the OSNR monitor 100 is used as the receiver employing the phase shift keying method, the rate of the delay time may not set to 0. Therefore, the rate t is set to 0 when the OSNR monitor 100 is initially activated in this embodiment.

Subsequently, the OSNR measurement device 400 of the OSNR monitor 100 obtains the bandwidth "B (nm)" which has been set to the optical filter included in the demultiplexer 120 and average powers of the optical powers "P1 (mW) and P2 (mW)" of the optical signals supplied to the optical detectors PD1 and PD2 included in the DPSK receiver 300 (in operation S202).

Thereafter, the OSNR measurement device 400 of the OSNR monitor 100 assigns the rate t of the delay time which has been initially set to 0, the obtained bandwidth "B (nm)" and the obtained optical powers "P1 (mW) and P2 (mW)" to Expression (9) to thereby calculate the OSNR (in operation S203). Note that, in this embodiment, the OSNR is described as a "reception OSNR" representing quality of signals supplied to the optical detectors in FIG. 16.

Then, the OSNR measurement device 400 stores the measured OSNR in a registry or the like (in operation S204), and determines whether the measured OSNR is equal to or larger than a predetermined threshold value so as to determine whether the measured OSNR is a normal value (in operation S205). When it is determined that the measured OSNR is a normal value (or within a normal range) (that is, when the determination is affirmative in operation S205), the OSNR measurement device 400 starts normal operation in operation S206.

On the other hand, when the measured OSNR is not a normal value (that is, when the determination is negative in operation S205), the OSNR measurement device 400 outputs OSNR abnormal warning to the management device or the like, and stops the system where appropriate (in operation S207).

Flow of OSNR Measurement Process in Normal Operation

As shown in FIG. 17, when the DPSK receiver 300 received an optical phase modulation signal output from the demultiplexer 120 (that is, when a determination is affirmative in operation S301), the OSNR measurement device 400 obtains the bandwidth "B (nm)" which has been set in the optical filter included in the demultiplexer 120.

Furthermore, in operation S302, the OSNR measurement device 400 also obtains the average values of the optical powers "P1 (mW) and P2 (mW)" input to the optical detectors PD1 and PD2, respectively. Moreover, the OSNR measurement device 400 obtains the delay time "τ (second)" from the delay circuit controller 310 or the delay interferometer 320 and obtains the bit rate "F (bps)" which has been predetermined by the administrator or the like. In addition, the OSNR measurement device 400 calculates the rate t of the delay time for one bit time "t=τ/T" using the delay time amount "τ (second)" and the bit rate "F (bps)".

Then, the OSNR measurement device 400 assigns the obtained bandwidth "B (nm)", the optical powers "P1 (mW and P2 (mW)", and the rate of the delay time "t=τ/T" to Expression (3) to thereby measure the OSNR (reception OSNR) when the optical signal is received (in operation S303).

Subsequently, the OSNR measurement device 400 stores the measured OSNR in the registry or the like (in operation S304) and determines whether the measured OSNR is equal to or larger than the predetermined threshold value to thereby determine whether the measured OSNR is a normal value (or within a predetermined range) (in operation S305). When it is determined that the measured OSNR is a normal value (or within a normal range) (that is, when the determination is affirmative in operation S305), the OSNR measurement device 400 continues the operation.

On the other hand, when it is determined that the measured OSNR is not a normal value (that is, when the determination is negative in operation S305), the OSNR measurement device 400 outputs OSNR abnormal warning to the management device or the like and stops the system where appropriate (in operation S306).

Advantage of Fourth Embodiment

As described above, according to the fourth embodiment, information required for the OSNR measurement is obtained from the DPSK transmitter 110 and the DPSK receiver 300 included in the OSNR monitor 100 and the information is used for the OSNR measurement. As a result, an expensive optical spectrum analyzer is not required and separation of an optical signal power and an ASE power from a signal spectrum at a time of signal modulation is not required. Accordingly, an OSNR is accurately measured.

Fifth Embodiment

Figure 18:
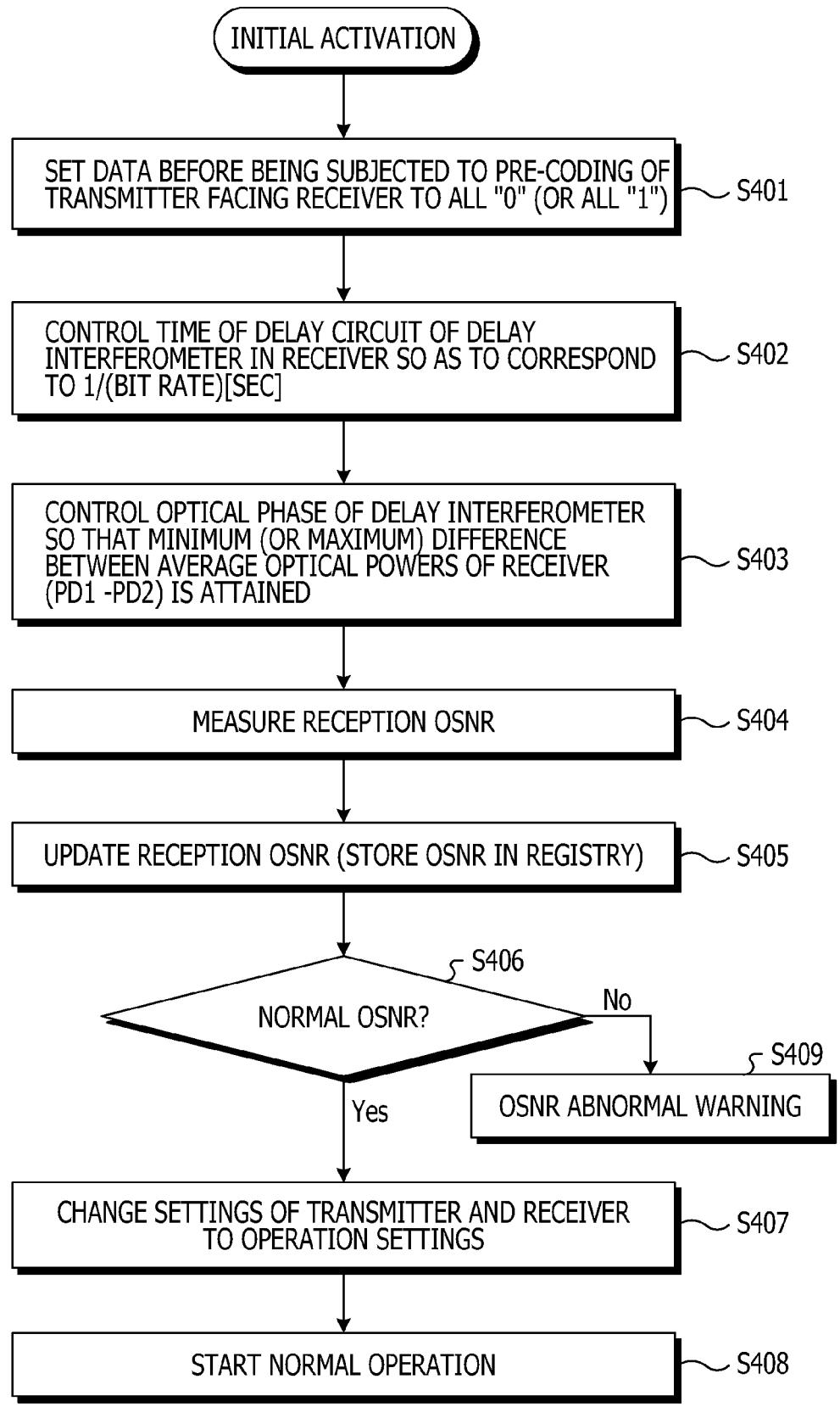
FIG. 18 illustrates a process performed when data which has not been subjected to pre-coding performed by a DPSK transmitter is set to All "0"
Figure 19:
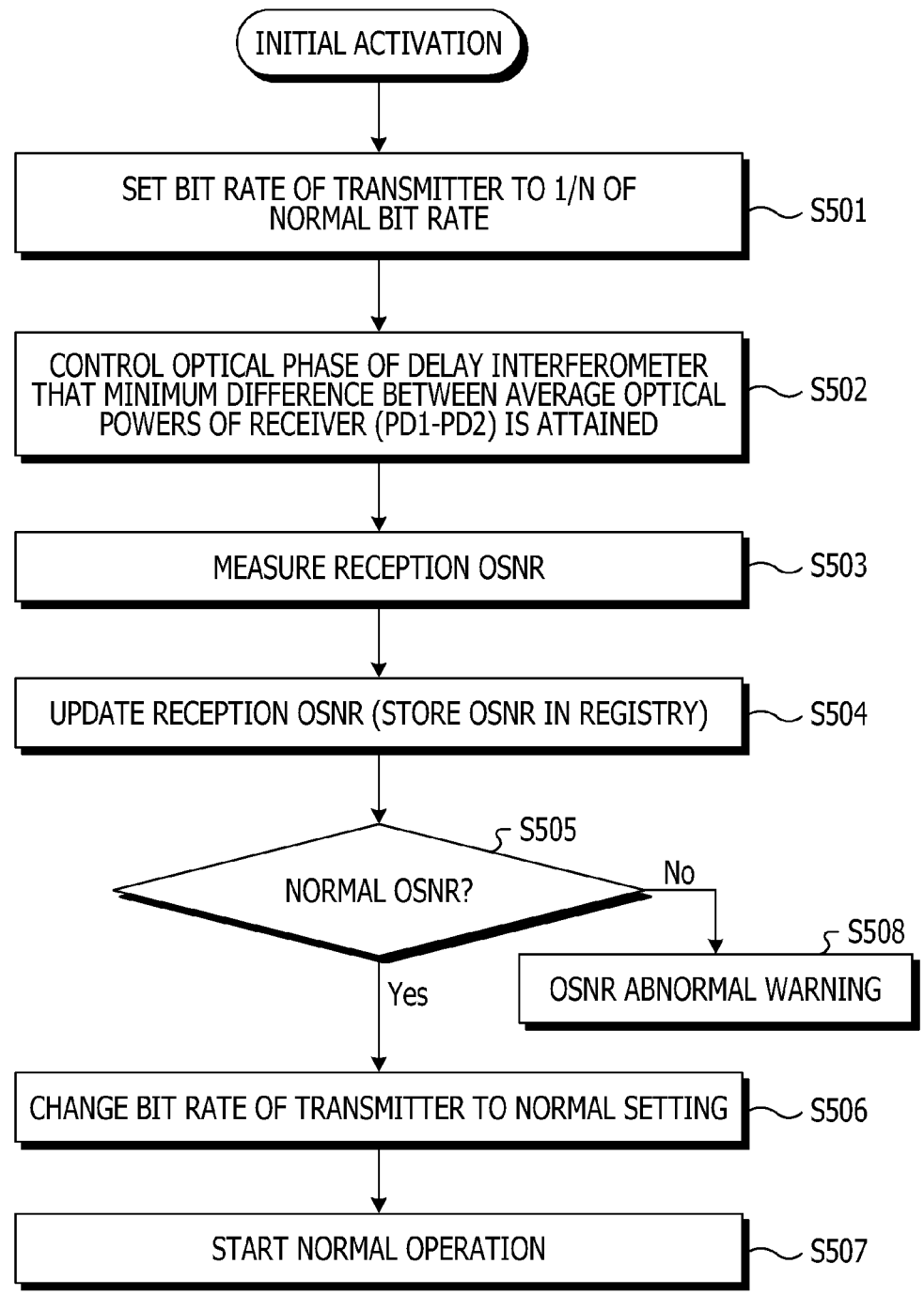
FIG. 19 illustrates a process performed when a bit rate of a DPSK transmitter is set to 1/N of a normal bit rate according to a fifth embodiment.

Examples of the method for improving accuracy of the OSNR monitor 1 described in the fourth embodiment include a method for setting data before being subjected to pre-coding of a DPSK transmitter 110 which faces a DPSK receiver 300 to All "0" (or All "1") and a method for setting a bit rate of the DPSK transmitter 110 to 1/N of a normal bit rate. Note that, in a fifth embodiment, processes shown in FIGS. 18 and 19 are performed before an optical communication system is operated.

As a fifth embodiment, a flow of a process performed when data which has not been subjected to pre-coding by a DPSK transmitter 110 is set to All "0" (or All "1") will be described with reference to FIG. 18. Furthermore, a flow of a process performed when the bit rate of the DPSK transmitter 110 is set to 1/N of a normal bit rate will be described with reference to FIG. 19.

Case where Data Before being Subjected to Pre-Coding by DPSK Transmitter is Set to All "0"

First, a flow of a process performed when data which has not been subjected to pre-coding performed by the DPSK transmitter 110 is set to All "0" (or All "1") will be described with reference to FIG. 18.

As shown in FIG. 18, an OSNR monitor 100 sets data to be input to a pre-coder 111 included in the DPSK transmitter 110 which faces a DPSK receiver 300 to All "0" (or All "1") (in operation S401). Subsequently, the OSNR monitor 100 operates a delay circuit controller 310 included in the DPSK receiver 300 so that a delay time of a delay circuit of a delay interferometer 320 is set to "1/bit rate" (in operation S402).

Furthermore, the OSNR monitor 100 controls an optical phase of the delay interferometer 320 so that a minimum (or maximum) difference between optical powers of optical signals input to optical detectors PD1 and PD2 included in the DPSK receiver 300, that is, a minimum (or maximum) difference between amounts of currents output from the optical detectors PD1 and PD2 is obtained (in operation S403).

Thereafter, the OSNR measurement device 400 of the OSNR monitor 100 assigns the delay time "t=1/bit rate" which has been initially set, a bandwidth "B(nm)" which has been set to a demultiplexer 120, and optical powers "P1 (mW) and P2 (mW)" to Expression (9) so as to measure an OSNR (in operation S404).

Then, the OSNR measurement device 400 stores the measured OSNR in the registry or the like (in operation S405), and determines whether the measured OSNR is equal to or larger than a predetermined threshold value, that is, whether the measured OSNR is a normal value (in operation S406). When it is determined that the measured OSNR is a normal value (or within a normal range) (that is, when the determination is affirmative in operation S406), settings of a transmitter and a receiver are changed to operation settings (in operation S407) so that normal operation is started (in operation S408).

On the other hand, when it is determined that the measured OSNR is not a normal value (that is, when the determination is negative in operation S406), the OSNR measurement device 400 outputs OSNR abnormal warning to the management device or the like and stops the system where appropriate (in operation S409).

Case where Bit Rate of DPSK Transmitter is Set to 1/N of Normal Bit Rate

Next, a flow of a process performed when the bit rate of the DPSK transmitter 110 is set to 1/N of a normal bit rate will be described with reference to FIG. 19.

As shown in FIG. 19, the OSNR monitor 100 sets a bit rate of the DPSK transmitter 110 to 1/N of a normal bit rate (in operation S501). Subsequently, the OSNR monitor 100 controls the optical phase of the delay interferometer 320 so that a minimum (or maximum) difference between optical powers of optical signals input to the optical detectors PD1 and PD2 included in the DPSK receiver 300 is obtained (in operation S502). In other words, the OSNR monitor 100 controls the optical phase of the delay interferometer 320 so that a minimum (or maximum) difference between average amounts of currents output from the optical detectors PD1 and PD2 is obtained.

Thereafter, the OSNR measurement device 400 of the OSNR monitor 100 assigns the delay time "t=τ×bit rate", the band width "B (nm)" which has been set to the demultiplexer 120, and the optical powers "P1 (mW) and P2 (mW)" to Expression (9) to thereby measure an OSNR (in operation S503).

Then, the OSNR measurement device 400 stores the measured OSNR in the registry or the like (in operation S504) and determines whether the measured OSNR is equal to or larger than a predetermined threshold value so as to determine whether the measured OSNR is a normal value (in operation S505). When it is determined that the measured OSNR is a normal value (or within a normal range) (that is, when the determination is affirmative in operation S505), the OSNR measurement device 400 changes the bit rate of the DPSK transmitter 110 to a normal setting (in operation S506) and starts normal operation (in operation S507).

On the other hand, when the measured OSNR is not a normal value (that is, when the determination is negative in operation S505), the OSNR measurement device 400 outputs OSNR abnormal warning to the management device or the like and stops the system where appropriate (in operation S508).

Advantage of Fifth Embodiment

As described above, according to the fifth embodiment, before the optical communication system is operated, an OSNR is measured using the method for setting data before being subjected to pre-coding by the DPSK transmitter 110 which faces the DPSK receiver 300 to All "0" (or All "1") or the method for setting the bit rate of the DPSK transmitter 110 to 1/N of a normal bit rate. As a result, accuracy of OSNR measurement (calculation) is improved.

Sixth Embodiment

Figure 20:
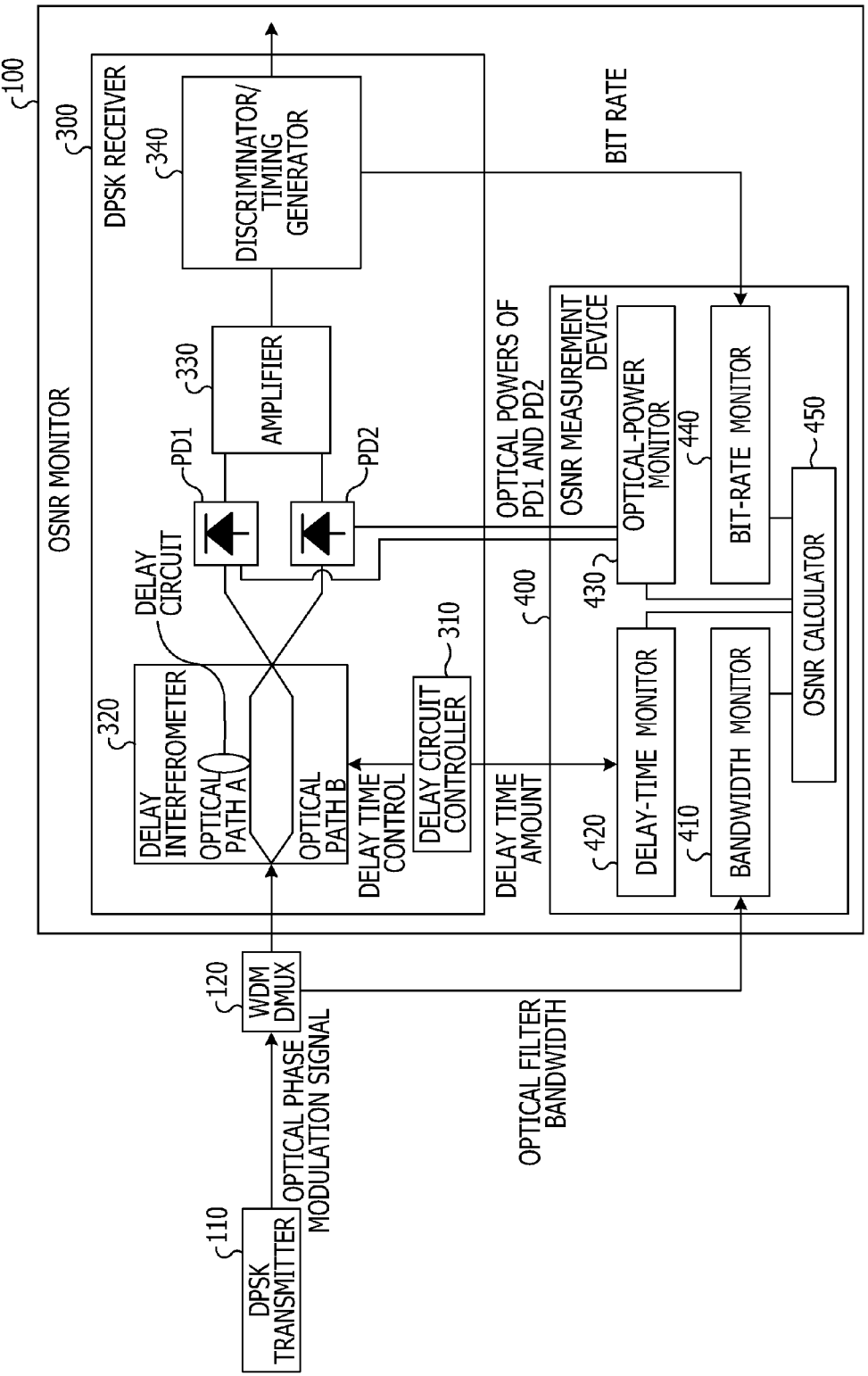
FIG. 20 illustrates a DPSK receiver including an amplifier and a discriminator/timing generator according to a sixth embodiment.

The DPSK receiver 300 according to the fourth embodiment may additionally include an amplifier 330 and a discriminator/timing generator 340 as shown in FIG. 20. FIG. 20 illustrates a DPSK receiver 300 including the amplifier 330 and the discriminator/timing generator 340.

The amplifier 330 included in the DPSK receiver 300 converts currents output from optical detectors PD1 and PD2 into voltages, performs equalizing amplification on the voltages so as to rectify waveforms thereof to the degree that the discriminator/timing generator 340 described below can perform signal discrimination and timing extraction, and outputs the waveforms to the discriminator/timing generator 340.

The discriminator/timing generator 340 included in the DPSK receiver 300 extracts clocks and bit rates for operation of the waveforms from the waveforms rectified by the amplifier 330, performs a process of discriminating "1" or "0" of the waveforms as data, and outputs a result of the process to a postprocessor or the like.

When the DPSK receiver 300 described above is used, a bit-rate monitor 440 included in the OSNR measurement device 400 obtains a bit rate from the discriminator/timing generator 340. Specifically, the optical detectors (PD1 and PD2) included in the DPSK receiver 300 output generated currents to the amplifier 330 or the like, and the amplifier 330 converts the currents into voltages, performs equalizing amplification on the voltages, rectifies waveforms thereof, and outputs the waveforms. Then, the discriminator/timing generator 340 extracts a clock and a bit rate for operation of the waveform from the waveforms rectified by the amplifier 330.

Then, the bit-rate monitor 440 obtains the bit rate "T (bps)" extracted by the discriminator/timing generator 340 and outputs the bit rate to the OSNR calculator 450. Note that the discriminator/timing generator 340 corresponds to "Regeneration/Retiming" of a 3R optical receiver (3R corresponds to capital letters of Reshaping, Retiming, and Regeneration).

As described above, irrespective of the configuration of the DPSK receiver 300, an expensive optical spectrum analyzer is not required and separation of an optical signal power and an ASE power from a signal spectrum at a time of signal modulation is not required. Accordingly, an OSNR is accurately measured.

Seventh Embodiment

An OSNR monitor 100 may include a narrow-band optical filter so that accuracy of a bandwidth of the optical filter is reliably improved similarly to the second embodiment even when the optical modulation methods described in the fourth to sixth embodiments are employed.

Figure 21:
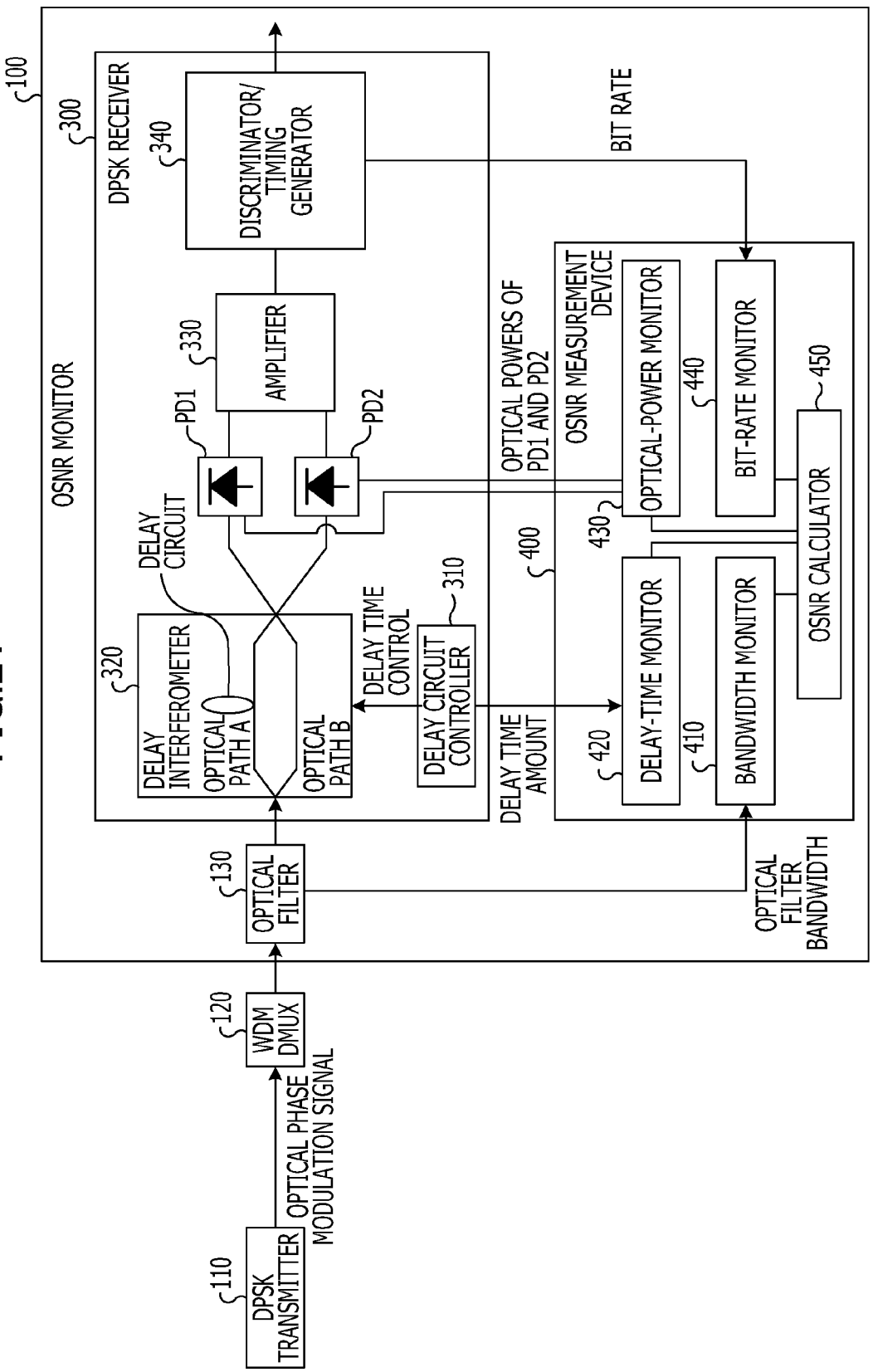
FIG. 21 illustrates a configuration of an OSNR monitor including an optical filter according to a seventh embodiment.

Specifically, as shown in FIG. 21, an OSNR monitor 100 includes an optical filter 130 before a DPSK receiver 300, that is, between the DPSK receiver 300 and a demultiplexer 120. The optical filter 130 is used for a band narrower than a band for an optical filter of the demultiplexer 120 so that accuracy of a bandwidth of the optical filter 130 is reliably improved. The optical filter 130 performs filtering on optical phase modulation signals output from the demultiplexer 120 using a predetermined bandwidth and outputs optical signals which passed through the filter to the delay interferometer 320. Note that examples of the optical filter 130 include a bandpass filter and an interleaver. FIG. 21 illustrates a configuration of an OSNR monitor including the optical filter 130.

In this case, a bandwidth monitor 410 included in an OSNR measurement device 400 obtains a bandwidth "B (nm)" from the optical filter 130, and outputs the bandwidth "B (nm)" to the OSNR calculator 450. Note that a delay-time monitor 420, an optical-power monitor 430, and the OSNR calculator 450 have functions the same as those of the fourth embodiment, and therefore, descriptions thereof are omitted.

As described above, according to the seventh embodiment, a bandwidth of the narrow-band optical filter 130 is actually measured to thereby an OSNR is measured. Accordingly, the OSNR is more accurately measured.

Eighth Embodiment

In the fourth embodiment, the case where the OSNR measurement device 400 is connected to the DPSK receiver 300 of the optical communication system which employs the phase shift keying method (for example, an NRZ-DPSK method) as an optical modulation method different from an optical intensity modulation method to thereby measure an OSNR is described. However, this application is not limited to this, and an optical communication system which employs the phase shift keying method may include a phase modulation receiver used to measure an OSNR so as to obtain information required for the OSNR measurement from the newly-provided phase modulation receiver.

Figure 22:
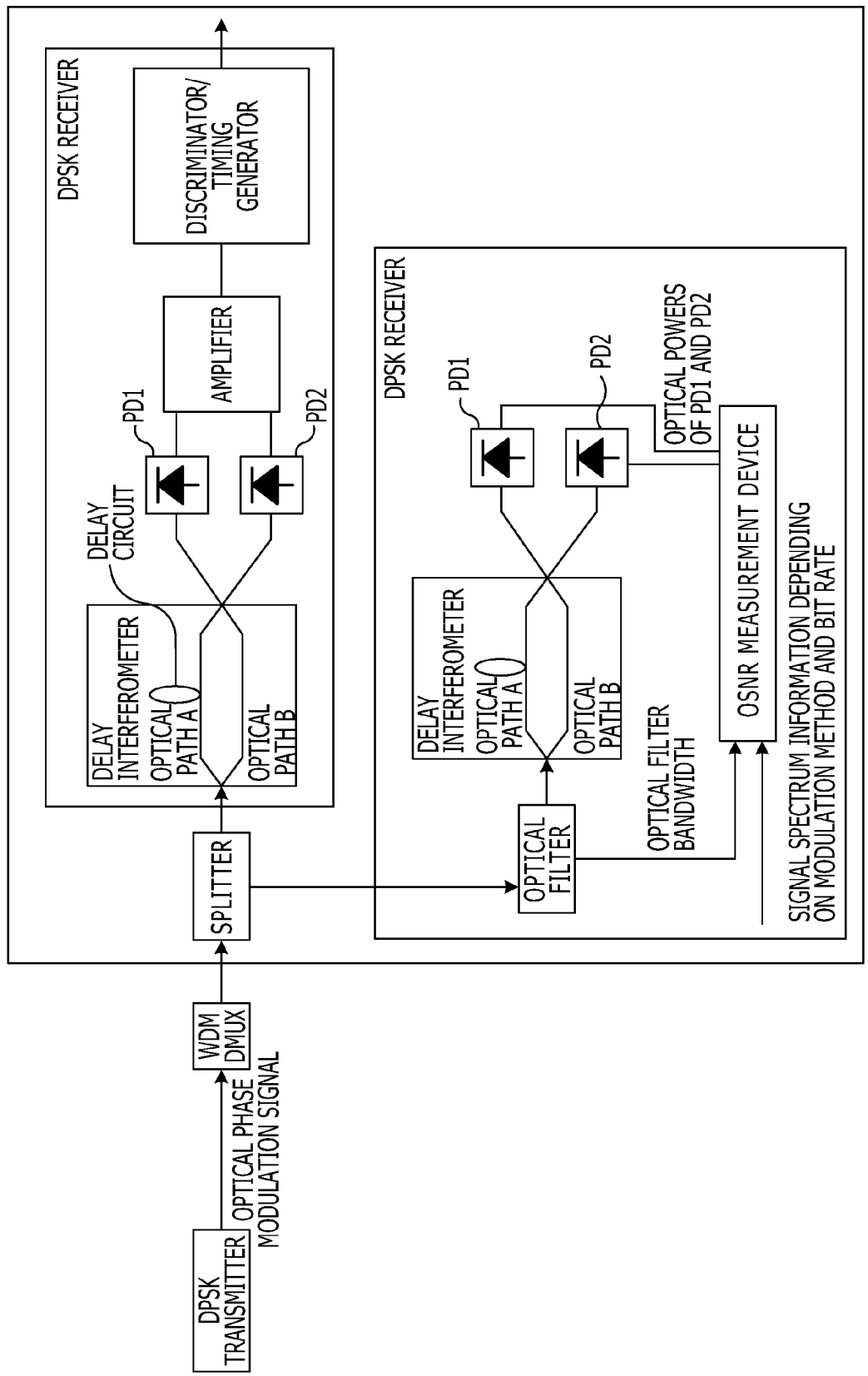
FIG. 22 illustrates an entire configuration of an OSNR monitor according to an eighth embodiment.

According to an eighth embodiment, a configuration example of an optical communication system which employs the phase shift keying method and which additionally includes an ONSR monitor used for the OSNR measurement will be described with reference to FIG. 22. FIG. 22 illustrates an entire configuration of the OSNR monitor according to the eighth embodiment.

As shown in FIG. 22, the OSNR monitor according to the eighth embodiment includes a splitter which separates some of signals output from a demultiplexer to a DPSK receiver and an OSNR device so that the OSNR monitor is realized as a receiver which employs the phase shift keying method. Furthermore, the OSNR device includes an optical filter, an MZ (Mach-Zehnder) interferometer for the OSNR monitor, optical detectors PD1 and PD2, and an OSNR measurement circuit.

The optical filter is used for a band narrower than a band of an optical filter, such as demultiplexer, of an optical signal input side (WDM DMUX). The filter is not essential. Note that examples of the narrow-band optical filter include a bandpass filter and an interleaver.

The OSNR measurement circuit has a function the same as that of the fourth embodiment and obtains a bandwidth (B) from the optical filter, obtains amounts of currents output from the optical detectors PD1 and PD2, and measures or calculates a delay amount "t" using a modulation method obtained by a user's input and signal spectrum information which depends on a bit rate (which is obtained from the DPSK transmitter 110, for example). The OSNR measurement circuit assigns the obtained information to Expression (2) or Expression (9) to thereby measure an OSNR.

In a general OSNR monitor, a rate t of a delay time for one bit time of at least equal to or larger than 0.6 is required in order to identify a code of the phase shift keying signal. Furthermore, in order to improve sensitivity of the OSNR monitor, the rate t may be smaller. Furthermore, at a time of signal modulation, a signal spectrum spreads. Therefore, when an optical filter for a band narrower than a signal band is used, an OSNR may be measured taking part of signal which is removed into consideration based on signal spectrum information which depends on a modulation method and a bit rate.

According to the eighth embodiment, an OSNR is reliably measured not only before an optical communication system is operated as described in the fourth and fifth embodiments but also in operation of the optical communication system.

Ninth Embodiment

The OSNR measurement device disclosed in this application not only outputs a measured OSNR to a management device for display but also performs feedback control of OSNR compensation using the measured OSNR.

Figure 23:
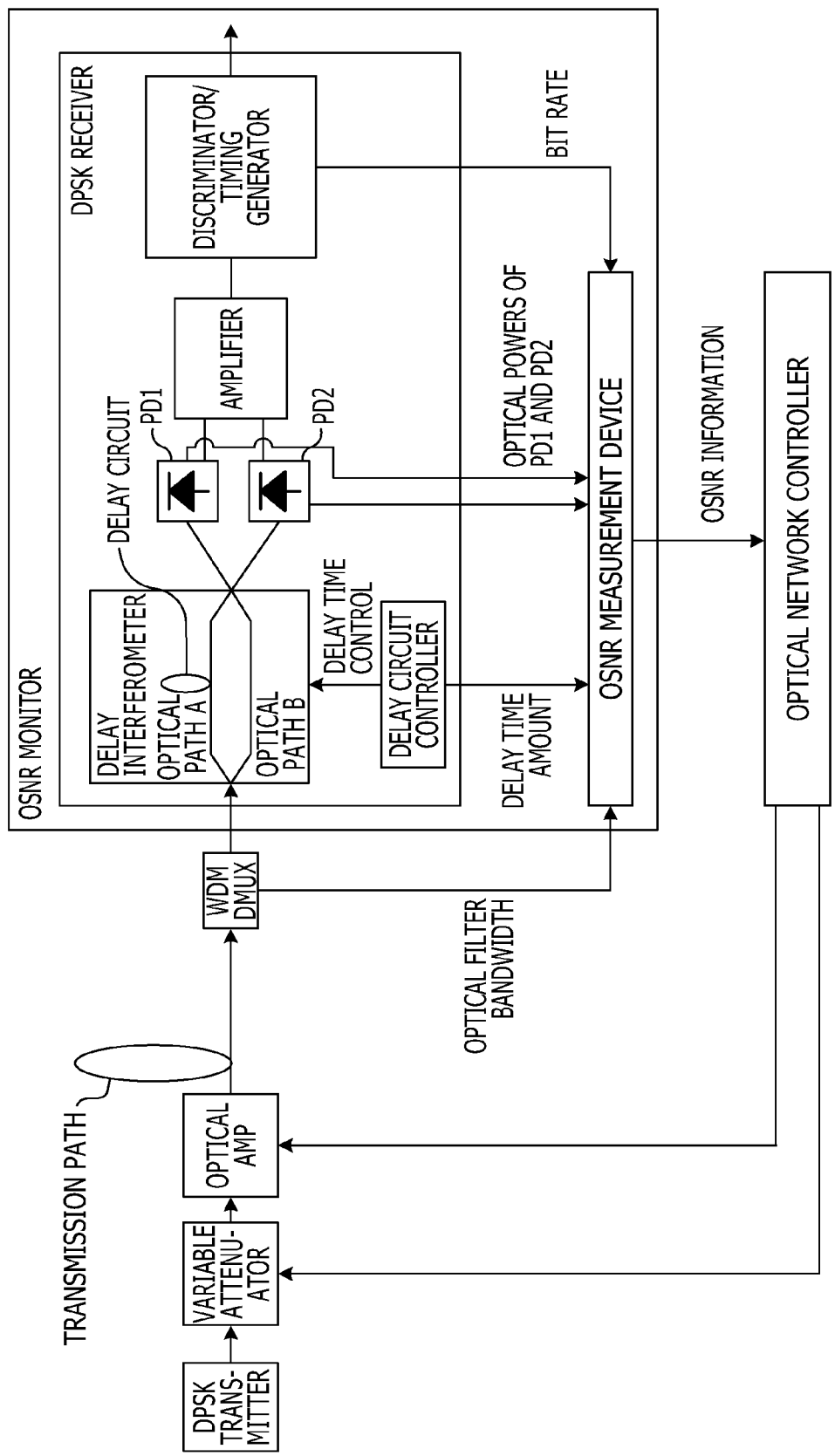
FIG. 23 illustrates an entire configuration of feedback control of OSNR compensation according to a ninth embodiment.
Figure 24:
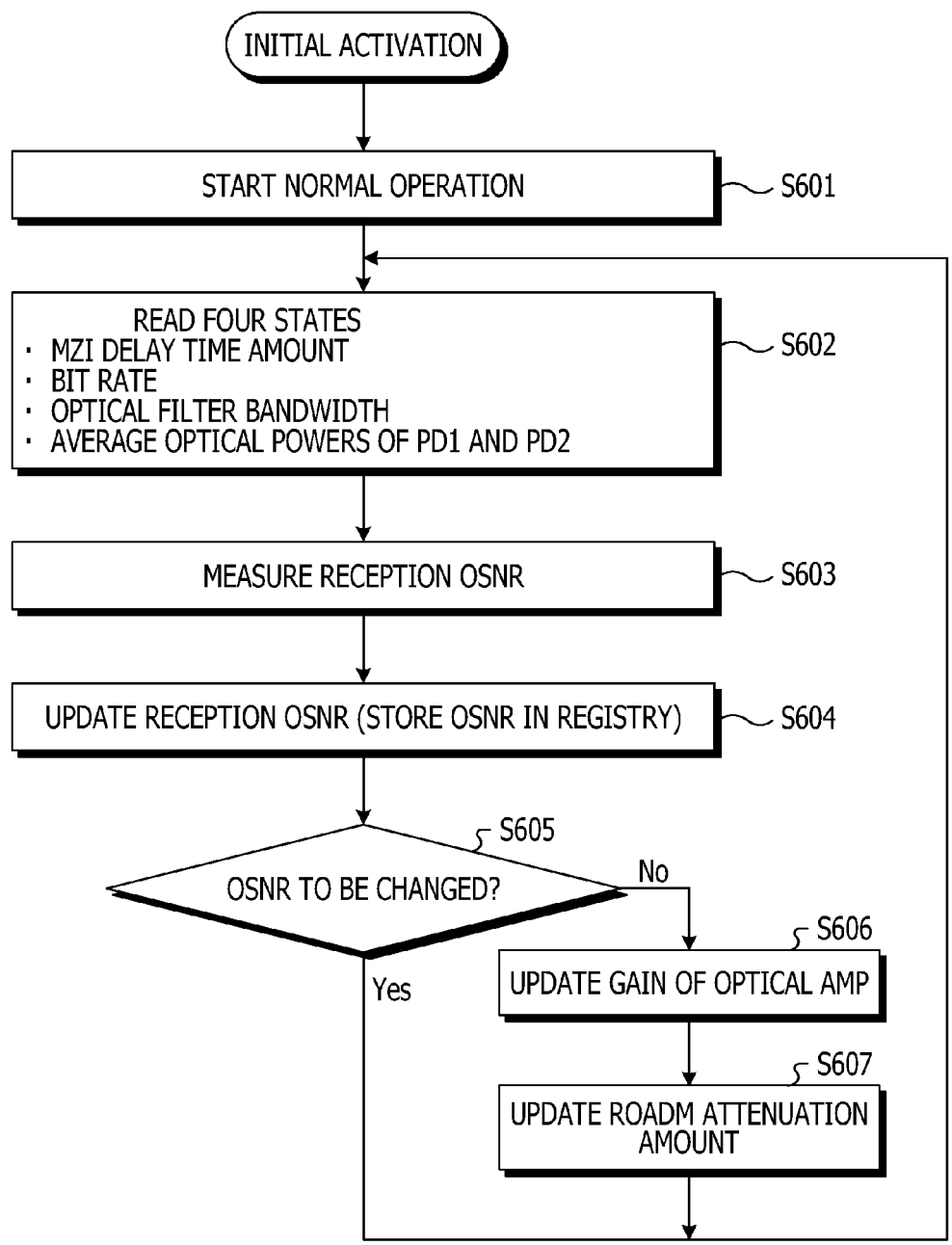
FIG. 24 illustrates the feedback control of the OSNR compensation.

Accordingly, in a ninth embodiment, feedback control of OSNR compensation using a measured OSNR will be described with reference to FIGS. 23 and 24. FIG. 23 illustrates an entire configuration of the feedback control of the OSNR compensation according to the ninth embodiment. FIG. 24 illustrates a method for performing the feedback control of the OSNR compensation.

As shown in FIG. 23, the OSNR monitor measures an OSNR of the optical receiver shown in FIG. 1 using one of the methods according to the fourth to eighth embodiments. Then, an optical network controller detects an OSNR value using the OSNR measurement device and operates a medium which is included in an optical transmission path and which acts on the OSNR. For example, the optical network controller obtains the OSNR measured by the OSNR measurement device and changes settings of attenuation amounts of variable attenuators included in an ROADM, an amplification amount of an optical amplifier, and a gain and an output level of an EDFA in accordance with the obtained OSNR.

Next, the flow of the feedback control of the OSNR compensation will be described with reference to FIG. 24. As shown in FIG. 24, after the OSNR monitor starts normal operation (in operation S601), when an OSNR measurement timing has been reached, the OSNR monitor obtains a bandwidth "B (nm)", a delay time amount "τ (second)", optical powers "P1 (mW) and P2 (mW)", and a bit rate "F (bps)" by one of the methods according to the fourth to eighth embodiments (in operation S602). Note that a user may arbitrarily specify the OSNR measurement timing such as "every hour" or "an hour after the OSNR is measured (updated)".

Subsequently, the OSNR monitor measures an OSNR (in operation S603) and stores a result of the measurement in a registry (in operation S604). Then, the OSNR monitor determines whether the OSNR is to be changed based on a threshold value or the like (in operation S605).

When it is determined that the OSNR is to be changed (that is, when the determination is affirmative in operation S605), the OSNR monitor updates the gain of the optical amplifier (in operation S606) and updates the attenuation amounts of the variable attenuators (in operation S607), and thereafter, the process returns to operation S602 and the subsequent processes is performed again. On the other hand, when it is determined that a change of the OSNR is not required (that is, when the determination is negative in operation S605), the process returns to operation S602 without performing the processes in operation S606 and operation S607 and the subsequent processes are performed again.

In general, various techniques of feedback control of dispersion compensation have been proposed, and examples of such a technique include a method for detecting the number of error corrections of the optical receiver shown in FIG. 1 and controlling a dispersion compensation amount so that the minimum number of bit errors is obtained. Furthermore, after two feedback control processes are separately terminated, a determination as to whether transmission quality is within an expected range, that is, whether transmission quality is normal or abnormal may be made. For example, the number of bit errors of a receiver is used for detection of the transmission quality. When it is determined that the transmission quality is abnormal and when information on a bandwidth of an optical filter, information on a bit rate, an output of OSNR measurement device after the feedback of the OSNR compensation is terminated, and a dispersion compensation control loop are normal, a function of discriminating an influence caused by another transmission deterioration parameter may be provided.

A flow of a process of detecting transmission quality using feedback control of dispersion compensation will be described with reference to FIG. 25.

Figure 25:
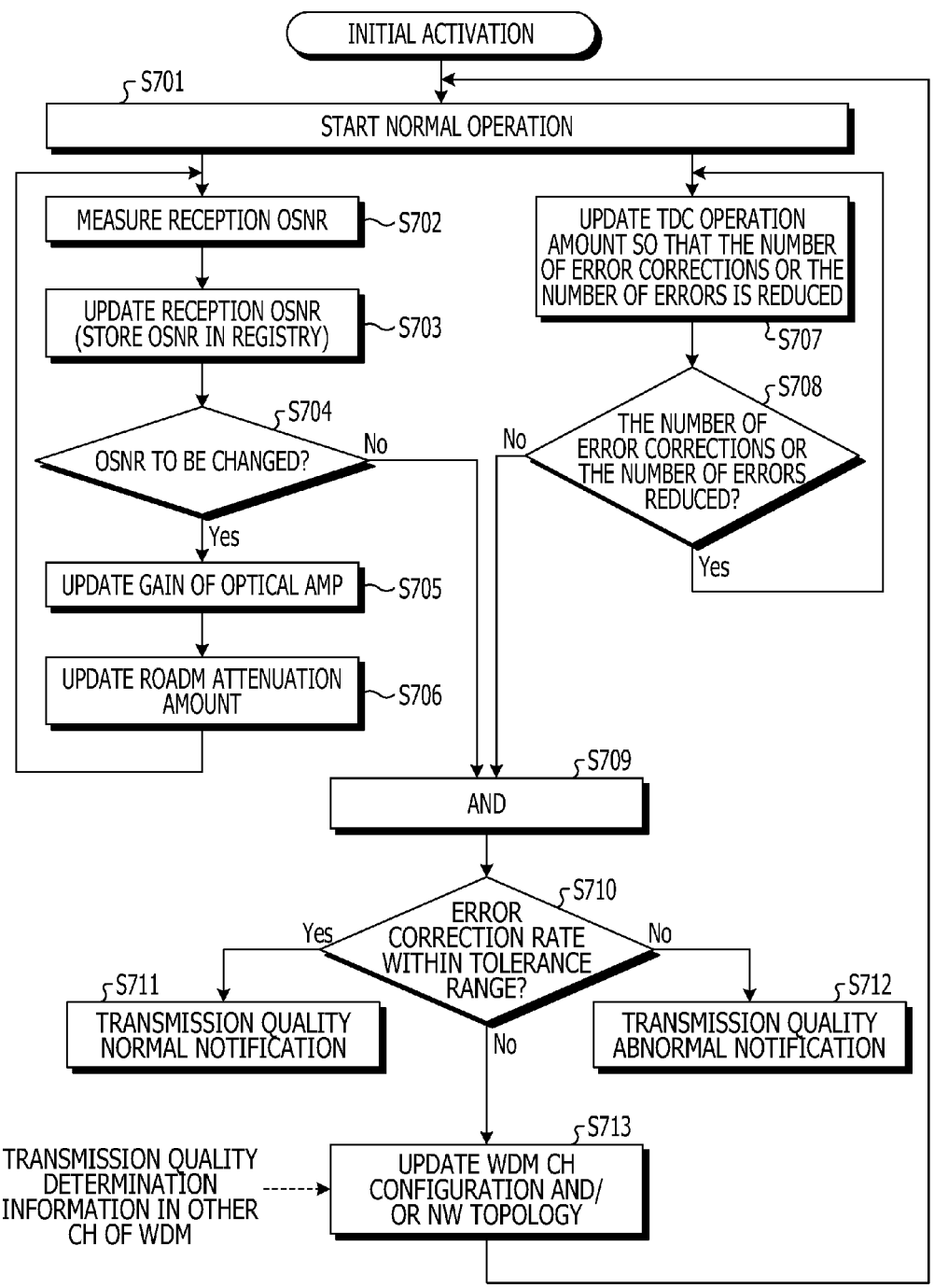
FIG. 25 illustrates a process of detecting transmission quality by dispersion compensation and the feedback control of the OSNR compensation.

As shown in FIG. 25, after the OSNR monitor starts normal operation (in operation S701), when an OSNR measurement timing has been reached, the OSNR monitor obtains the bandwidth "B (nm)", the delay time amount "τ (second)", the optical powers "P1 (mW) and P2 (mW)", and the bit rate "F (bps)" by one of the methods according to the fourth to eighth embodiments and measures an OSNR (in operation S702). Subsequently, the OSNR monitor stores a result of the measurement in the registry (in operation S703). Then, the OSNR monitor determines whether the OSNR is to be changed based on a threshold value or the like (in operation S704). Note that information on a transmission distance and information on an error correction rate may be additionally used for the determination as to whether the OSNR is to be changed.

When it is determined that the OSNR is to be changed (that is, when the determination is affirmative in operation S704), the OSNR monitor updates the gain of the optical amplifier (in operation S705) and updates the attenuation amounts of the variable attenuators (in operation S706), and thereafter, the process returns to operation S702.

In parallel to this process, after the OSNR monitor starts the normal operation (in operation S701), the OSNR monitor updates an operation amount of a TDC (Tunable Dispersion Compensator) so that the number of error corrections or the number of errors is reduced (in operation S707) and determines whether the number of error corrections or the number of errors is reduced (in operation S708). When it is determined that the number of error corrections or the number of errors is reduced (that is, when the determination is affirmative in operation S708), the OSNR monitor returns to operation S707 and the subsequent process is performed again.

On the other hand, when it is determined that a change of the OSNR is not required (that is, when the determination is negative in operation S704) or when the number of error corrections or the number of errors is not reduced (that is, when the determination is negative in operation S708), the OSNR monitor determines whether an error correction rate is within a tolerance range (in operation S710).

When it is determined that the error correction rate is within the tolerance range (that is, when the determination is affirmative in operation S710), the OSNR monitor notifies a management device or the like of a transmission-quality normal notification (in operation S711).

On the other hand, when it is determined that the error correction rate is out of the tolerance range (that is, when the determination is negative in operation S710), the OSNR monitor notifies the management device or the like of a transmission-quality abnormal notification in operation S712. Furthermore, the OSNR monitor updates a channel configuration and a network topology of a WDM using transmission-quality determination information and the like of another channel of the WDM (in operation S713), and thereafter, the processes in operation S701 onwards are performed again.

As described above, according to the ninth embodiment, parameters which cause transmission deterioration such as PMD, XPM, and FWM are known, and these parameters depend on quality of a wavelength channel configuration, a line topology, and an optical fiber. Accordingly, a transmission characteristic of a network can be improved by controlling the parameters. Furthermore, similarly to receivers of other channels, transmission quality of the entire WDM network can configure a network management system (NMS) which integrally manages states of various channels while the transmission quality including an OSNR detection value is monitored. Furthermore, similarly to a bit error rate monitor (BER monitor), the OSNR is reliably monitored independently from PDM, XPM, and FWM.

Tenth Embodiment

The embodiments of the present invention are described above. However, the present invention is not limited to the embodiments described above and various modifications may be made. Here, as described below, a phase modulator, a phase modulation method, an optical power, a system configuration, and a program are individually described as different embodiments.

Phase Modulator

Figure 26:
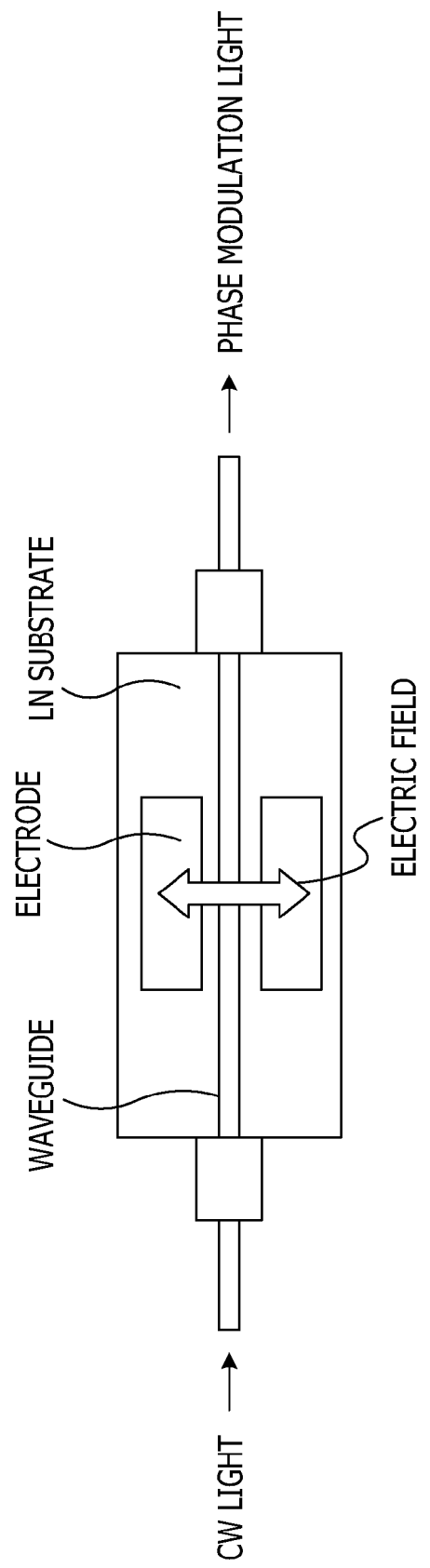
FIG. 26 illustrates a configuration of a single-drive phase modulator.
Figure 27:
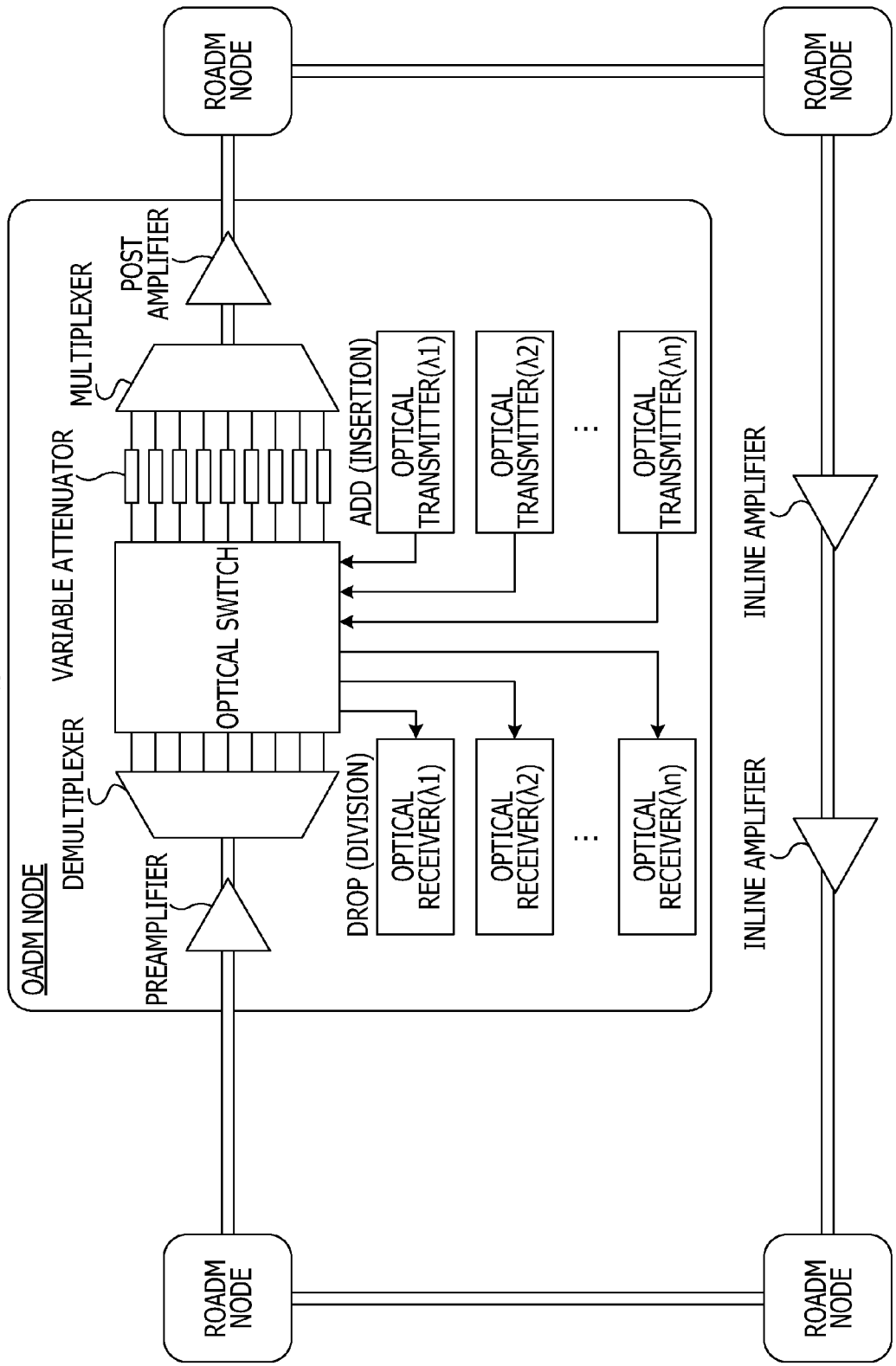
FIG. 27 illustrates an entire configuration of an optical communication system according to the related art.
Figure 28:
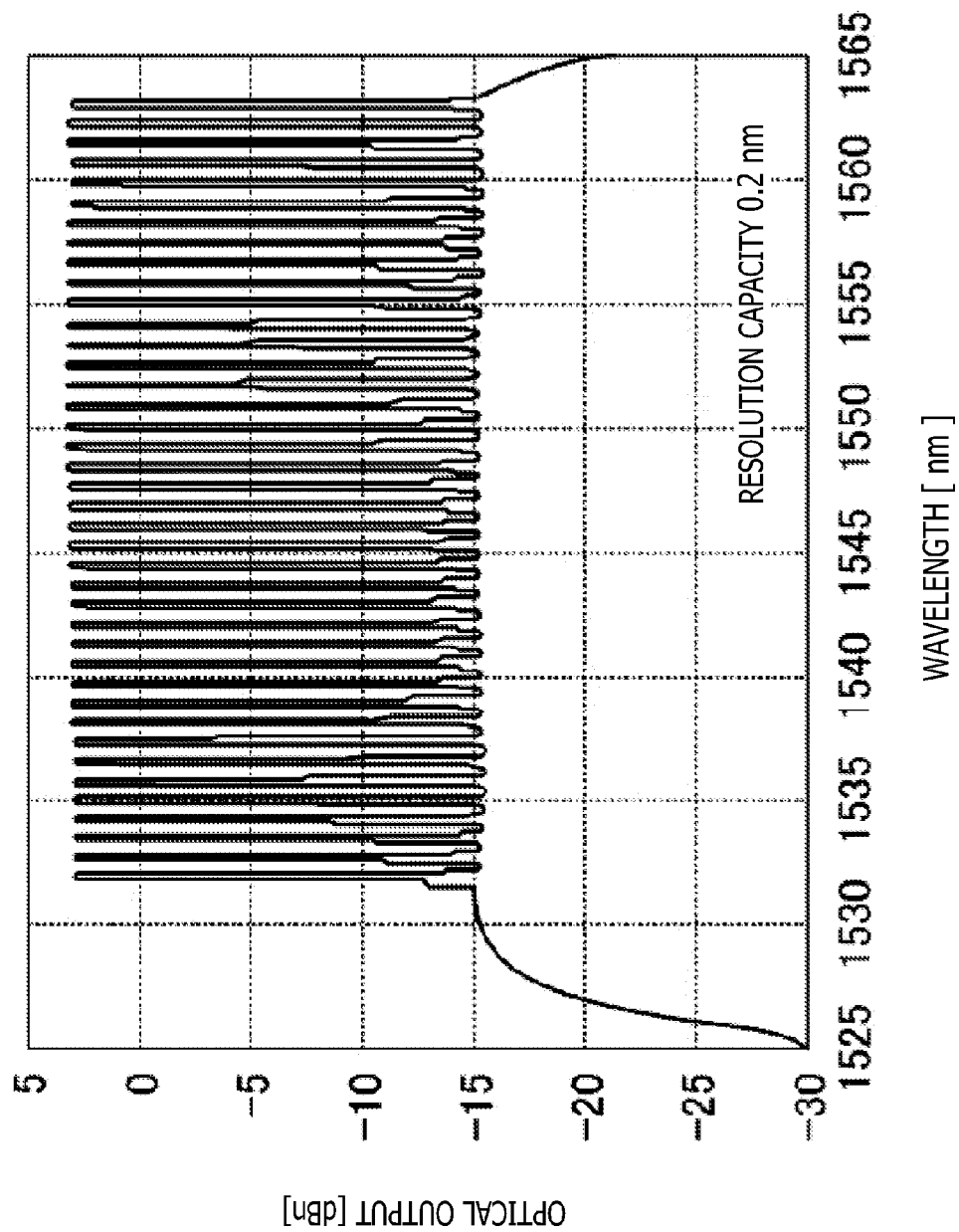
FIG. 28 illustrates an example of a spectrum supplied to a demultiplexer after being amplified in the optical communication system according to the related art.
Figure 29:
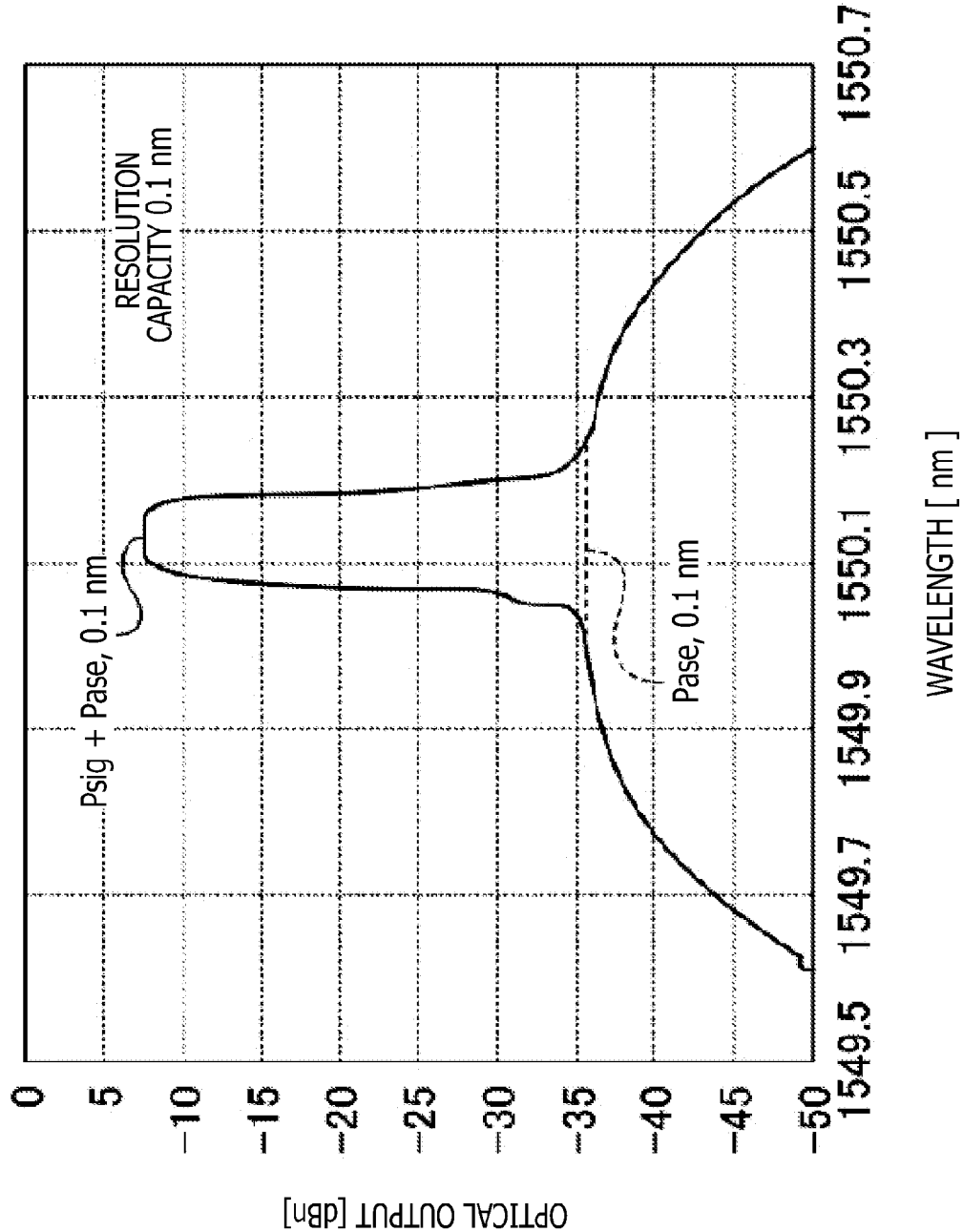
FIG. 29 illustrates an example of a spectrum obtained through demultiplexing performed by a wavelength demultiplexer in the optical communication system according to the related art.
Figure 30:
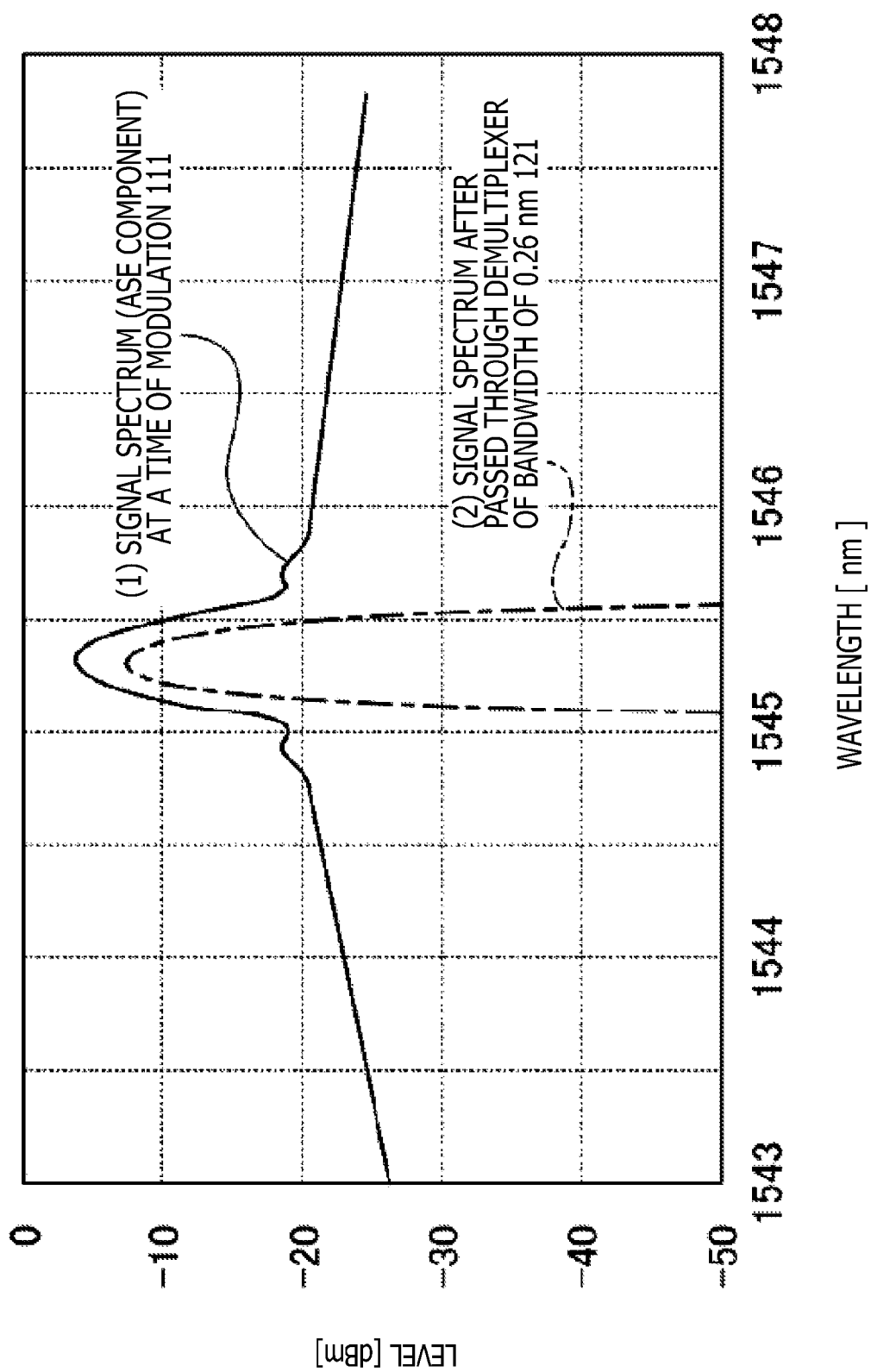
FIG. 30 illustrates signal spectra at a time of signal modulation in the optical communication system according to the related art.

For example, in the fourth embodiment, the case where a phase modulation signal is generated using the differential-drive MZ phase modulator is described. However, various phase modulators such as a single drive phase modulator shown in FIG. 26 may be used.

Phase Modulation Method

For example, in the fourth to ninth embodiments, the case where the DPSK method is employed as the phase shift keying method is described. However, the fourth to ninth embodiments may be employed for not only the DPSK method but also general DMPSK ("M" is 2 to the n-th power and "n" is a natural number) modulation methods. Furthermore, the fourth to ninth embodiments may be employed for a phase modulation method in which shift does not occur.

Optical Power

For example, in the foregoing embodiments, the example in which the optical powers of the optical signals received by the optical detectors PD1 and PD2 are obtained from the optical detectors PD1 and PD2 is described. However, this application is not limited to this. Specifically, the optical detectors PD1 and PD2 output currents corresponding to the optical powers of the received optical signals. Therefore, the optical power monitor described above converts the currents output from the optical detectors PD1 and PD2 into voltages and calculates optical powers (optical powers of the optical signals received by the optical detectors PD1 and PD2) from the converted voltages. Then, the OSNR calculator may assign the optical powers calculated by the method described above to Expression (2) or Expression (9) to thereby calculate an OSNR.

Furthermore, it is not necessary that the OSNR measurement device disclosed in this application calculates optical powers. For example, values of the currents output from the optical detectors PD1 and PD2 are changed in accordance with the optical powers of the optical signals input to the optical detectors PD1 and PD2. Therefore, when current/voltage linear amplification is performed on the optical powers of the input optical signals and when gains of the amplifications are the same as each other, the optical powers of the input optical signals are equal to the current values (voltage values) which have been subjected to the linear amplification. In this case, even when the OSNR measurement device does not calculate the optical powers, the OSNR measurement device obtains the currents output from the optical detectors PD1 and PD2 and assigns the obtained current values to the optical detectors PD1 and PD2 in Expressions (2) and (9) to thereby calculate an OSNR.

System Configuration

The components of the devices included in the drawings are functional concepts and it is not necessarily the case that the components are physically configured as shown in the drawings. That is, concrete embodiments of dispersion and integration of the devices are not limited to those shown in the drawings, and all or some of the devices may be functionally or physically dispersed or integrated in an arbitrary unit in accordance with various loads and use states. Furthermore, all or some of process functions performed by the devices may be realized by a CPU or a program which is analyzed and executed by the CPU or realized as hardware of a wired logic.

Furthermore, among the processes described in the first embodiment, all or some of the processes which are automatically performed may be manually performed or all or some of the processes which are manually performed may be automatically performed by a known method. In addition, the processing procedures, the control procedures, concrete names, and the information including the various data and the parameters described in the specification and the drawings may be arbitrarily changed unless otherwise designated.

Program

Note that the OSNR measurement method described in the first embodiment may be realized by executing a program which is provided in advance using a computer such as a personal computer or a work station. The program may be delivered through a network such as the Internet. Furthermore, the program may be recorded in a computer readable recording medium such as a hard disk, a flexible disk (FD), a CD-ROM (Compact Disc-Read Only Memory), an MO (Magneto-optic Disc), or a DVD (Digital Versatile Disc) and executed after being read from the recording medium using the computer.

The OSNR measurement device disclosed in this application can accurately measure an OSNR without using an expensive optical spectrum analyzer.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal. The media described above may be non-transitory media.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An optical signal-to-noise ratio (OSNR) monitor device, comprising:
   an optical receiver including a delay interferometer, which inputs a phase modulated optical signal in accordance with a given bandwidth and outputs two optical signals and causes the optical signals to interfere with each other, optical detectors, which output currents in accordance with optical powers of the optical signals output from the interferometer, and an optical filter that performs filtering on optical signals that have been subjected to a demultiplexing in accordance with a bandwidth smaller than the given bandwidth;
   an optical power monitor configured to obtain the optical powers of the optical signals received by the optical detectors included in the optical receiver; and
   an OSNR calculator configured to calculate an optical signal-to-noise ratio in accordance with the optical powers obtained from the optical power monitor and a reception bandwidth,
   wherein the bandwidth that has been set to the optical filter is obtained by a bandwidth monitor included in the OSNR monitor device.

2. The OSNR monitor device according to claim 1, wherein the optical filter is a bandpass filter, an interleaver, or an AWG (Arrayed-Waveguide Grating).

3. The OSNR monitor device according to claim 1, wherein the OSNR calculator calculates the following Expression (2):

Expression (2)

$$OSNR[\text{dB}] = 10 \times \log(P2 - P1) - 10 \times \log\left(2 \times P1 \times \frac{0.1}{B}\right) \quad (2)$$

where "B" denotes the bandwidth, "P1" and "P2" denote the optical powers, and "OSNR" denotes the optical signal-to-noise ratio.

4. The OSNR monitor device according to claim 1, further comprising:
   a warning transmission circuit configured to transmit a warning when the optical signal-to-noise ratio calculated by the OSNR calculator is equal to or smaller than a predetermined threshold value that represents an abnormal value.

5. An optical signal-to-noise ratio (OSNR) monitor device, comprising:
   an optical receiver including a delay interferometer, which divides a phase modulation signal in accordance with a given bandwidth and subjected to amplitude shift keying into two signals and causes the signals to interfere with each other, optical detectors, which output currents in accordance with the optical signals output from the interferometer, an amplifier that amplifies the currents output from the optical detectors so as to obtain predetermined current amounts, and an optical filter that performs filtering on modulation signals that have been subjected to a demultiplexing in accordance with a bandwidth smaller than the given bandwidth;
   an optical power monitor configured to obtain the optical powers of the optical signals received by the optical detectors included in the optical receiver; and
   an OSNR calculator configured to calculate an optical signal-to-noise ratio in accordance with the optical powers obtained from the optical power monitor and a reception bandwidth,
   wherein the bandwidth that has been set to the optical filter is obtained by a bandwidth monitor included in the OSNR monitor device.

6. The OSNR monitor device according to claim 5, wherein the modulation signal is an amplitude shift phase keying signal.

7. An optical signal-to-noise ratio (OSNR) monitor device, comprising:
   a phase modulation receiver including a delay interferometer, which divides a phase modulation signal in accordance with a given bandwidth so as to obtain phase modulation signals and which causes one of the obtained phase modulation signals which has been delayed by a predetermined time amount to interfere with the other of the obtained phase modulation signals which has not been delayed, and optical detectors, which output currents in accordance with reception-light powers of the phase modulation signals output from the delay interferometer;
   a delay-time-amount monitor configured to obtain a delay time amount from the delay interferometer;
   an optical power monitor configured to obtain optical powers of the phase modulation signals received by the optical detectors included in the phase modulation receiver;
   a bit-rate monitor configured to obtain a bit rate when the phase modulation receiver receives the phase modulation signal; and
   an OSNR calculator configured to calculate an optical signal-to-noise ratio in accordance with the reception bandwidth, the delay time amount obtained by the delay-time-amount monitor, the optical powers obtained by the optical power monitor, and the bit rate obtained by the bit-rate monitor.

8. The OSNR monitor device according to claim 7,
   wherein the phase modulation receiver further includes an amplifier that converts the currents output from the optical detectors into voltages and that amplifies the voltages to predetermined amplitudes and a discriminator that discriminates a signal output from the amplifier, and
   the bit-rate monitor obtains a bit rate from the discriminator.

9. The OSNR monitor device according to claim 7,
   wherein the interferometer included in the phase modulation receiver divides a phase modulation signal that has been subjected to filtering performed by an optical filter with a bandwidth smaller than the reception bandwidth into two signals and causes the signals to interfere with each other, and
   the bandwidth monitor obtains the bandwidth set to the optical filter.

10. The OSNR monitor device according to claim 9, wherein the optical filter is a bandpass filter or an interleaver.

11. The OSNR monitor device according to claim 7, wherein the OSNR calculator calculates the following Expression (9):

Expression (9)

$$OSNR[\text{dB}] = 10 \times \log\left(\frac{P2 - P1}{1-t}\right) - 10 \times \log\left[\left(P1 + P2 - \frac{P2-P1}{1-t}\right) \times \frac{0.1}{B}\right] \quad (9)$$

where "B" denotes the bandwidth, "t" denotes a product of the delay time amount and the bit rate, "P1" and "P2" denote the optical powers, and "OSNR" denotes the optical signal-to-noise ratio.

12. An optical communication system that is connected to another optical communication system through a transmission path, the optical communication system comprising:
 a phase modulation transmitter configured to generate a phase modulation signal by performing phase modulation on source light;
 a phase modulation receiver including a demultiplexer that performs demultiplexing on the phase modulation signal generated by the phase modulation transmitter in accordance with a given bandwidth so as to obtain phase modulation signals, a delay interferometer that divides one of the phase modulation signals that have been subjected to the demultiplexing into two signals and causes one of the signals that has been delayed by a predetermined time amount to interfere with the other of the signals that has not been delayed, optical detectors that generate currents corresponding to reception-light powers of the optical signals supplied from the delay interferometer, an amplifier that converts the currents output from the optical detectors into voltages and amplifies the voltages to predetermined amplitudes, and a discriminator that discriminates a signal output from the amplifier; and
 an OSNR calculator that obtains the delay time amount used for the delay performed by the delay interferometer, the optical powers of the optical signals received by the optical detectors, and a bit rate extracted by the discriminator from the phase modulation receiver and calculates an optical signal-to-noise ratio.

13. The optical communication system according to claim 12, further comprising:
 variable attenuators configured to attenuate optical signals supplied through the transmission path;
 an amplifier configured to amplify the optical signals attenuated by the variable attenuators; and
 a control circuit configured to control attenuation amounts of the variable attenuators or output of the amplifier in accordance with the optical signal-to-noise ratio obtained by the OSNR calculator.

14. The optical communication system according to claim 12, further comprising:
 an error correction rate detecting circuit configured to detect an error correction rate of a signal received by the phase modulation receiver; and
 a quality detecting circuit configured to determine quality of light received by the phase modulation receiver in accordance with the optical signal-to-noise ratio calculated by the OSNR calculator after the control of the attenuation amounts of the variable attenuators or the output of the amplifier performed by the control circuit is terminated and in accordance with the error correction rate detected by the error correction rate detecting circuit.

15. The optical communication system according to claim 14, wherein the quality detecting circuit determines that signal quality deterioration occurred due to polarization dispersion or a nonlinear effect of an optical fiber transmission.

* * * * *